(12) United States Patent
Phan et al.

(10) Patent No.: US 9,901,021 B2
(45) Date of Patent: Feb. 27, 2018

(54) TACTILE GUIDANCE ARRANGEMENT FOR VEHICLES

(71) Applicant: Deere & Company, Moline, IL (US)

(72) Inventors: Austin H. Phan, Ankeny, IA (US); Bin Shi, Johnston, IA (US); William A. Brett, Polk City, IA (US); Brandon C. Carlson, Ankeny, IA (US); Tyler D. Schleicher, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 247 days.

(21) Appl. No.: 14/967,821

(22) Filed: Dec. 14, 2015

(65) Prior Publication Data

US 2016/0174454 A1 Jun. 23, 2016

Related U.S. Application Data

(60) Provisional application No. 62/093,898, filed on Dec. 18, 2014.

(51) Int. Cl.
| | |
|---|---|
| *G06F 17/10* | (2006.01) |
| *A01B 69/04* | (2006.01) |
| *G01C 21/20* | (2006.01) |
| *G01D 5/20* | (2006.01) |

(52) U.S. Cl.
CPC ............ *A01B 69/008* (2013.01); *G01C 21/20* (2013.01); *G01D 5/20* (2013.01)

(58) Field of Classification Search
CPC ......... A01B 69/008; G01C 21/20; G01C 5/20
See application file for complete search history.

(56) References Cited

U.S. PATENT DOCUMENTS

| | | | |
|---|---|---|---|
| 4,288,814 | A | 9/1981 | Talley et al. |
| 5,241,780 | A | 9/1993 | Zaun et al. |
| 5,403,026 | A | 4/1995 | Dahl |
| 5,540,108 | A | 7/1996 | Cook et al. |
| 5,836,399 | A | 11/1998 | Maiwald et al. |
| 5,850,727 | A | 12/1998 | Fox |
| 5,974,773 | A | 11/1999 | Rieck et al. |
| 7,430,815 | B2 | 10/2008 | Reichhardt |

(Continued)

FOREIGN PATENT DOCUMENTS

| | | |
|---|---|---|
| CN | 202937986 U | 5/2013 |
| CN | 203637813 U | 6/2014 |

(Continued)

OTHER PUBLICATIONS

Ultra Guidance PSR ISO. Operator's Manual [online]. Reichhardt [retrieved on Dec. 1, 2015]. Retrieved from the Internet: <http://www.reichhardt.com/us_service_operators-manuals.html>.

(Continued)

*Primary Examiner* — Hussein Elchanti

(57) ABSTRACT

Embodiments include a tactile guidance system and various mechanisms for orienting and mounting the tactile guidance system on motorized vehicles such as agricultural spray vehicles. For example, a rod-shaped tactile guidance detector is positioned protruding out sideways from the inner side of each of the front wheels of a self-propelled sprayer vehicle or a tractor. The guidance system is used to detect the location of objects including crops and plants and determine a path of travel.

20 Claims, 24 Drawing Sheets

(56) References Cited

U.S. PATENT DOCUMENTS

| | | | |
|---|---|---|---|
| 7,974,806 B1 | 7/2011 | Burns et al. | |
| 2003/0205420 A1* | 11/2003 | Mulhern | A61G 5/043 |
| | | | 180/65.1 |
| 2006/0006620 A1* | 1/2006 | Leggatt | G01V 3/15 |
| | | | 280/47.131 |
| 2006/0245919 A1* | 11/2006 | Krizik | F03B 7/00 |
| | | | 415/202 |
| 2009/0282794 A1 | 11/2009 | Wilcox et al. | |
| 2013/0000393 A1* | 1/2013 | Cash | G01N 27/223 |
| | | | 73/74 |
| 2016/0068182 A1* | 3/2016 | Becker | B62D 5/001 |
| | | | 180/403 |
| 2016/0185346 A1* | 6/2016 | Awamori | G05D 1/0231 |
| | | | 701/23 |
| 2017/0087951 A1* | 3/2017 | Hrovat | B60G 17/0165 |

FOREIGN PATENT DOCUMENTS

| | | |
|---|---|---|
| DE | 10253223 A1 | 5/2004 |
| DE | 102012112409 A1 | 6/2014 |
| EP | 0138007 A1 | 4/1985 |
| GB | 2063794 A | 6/1981 |

OTHER PUBLICATIONS

European Search Report issued in foreign counterpart application No. 15200903.1, dated May 13, 2016 (7 pages).

* cited by examiner

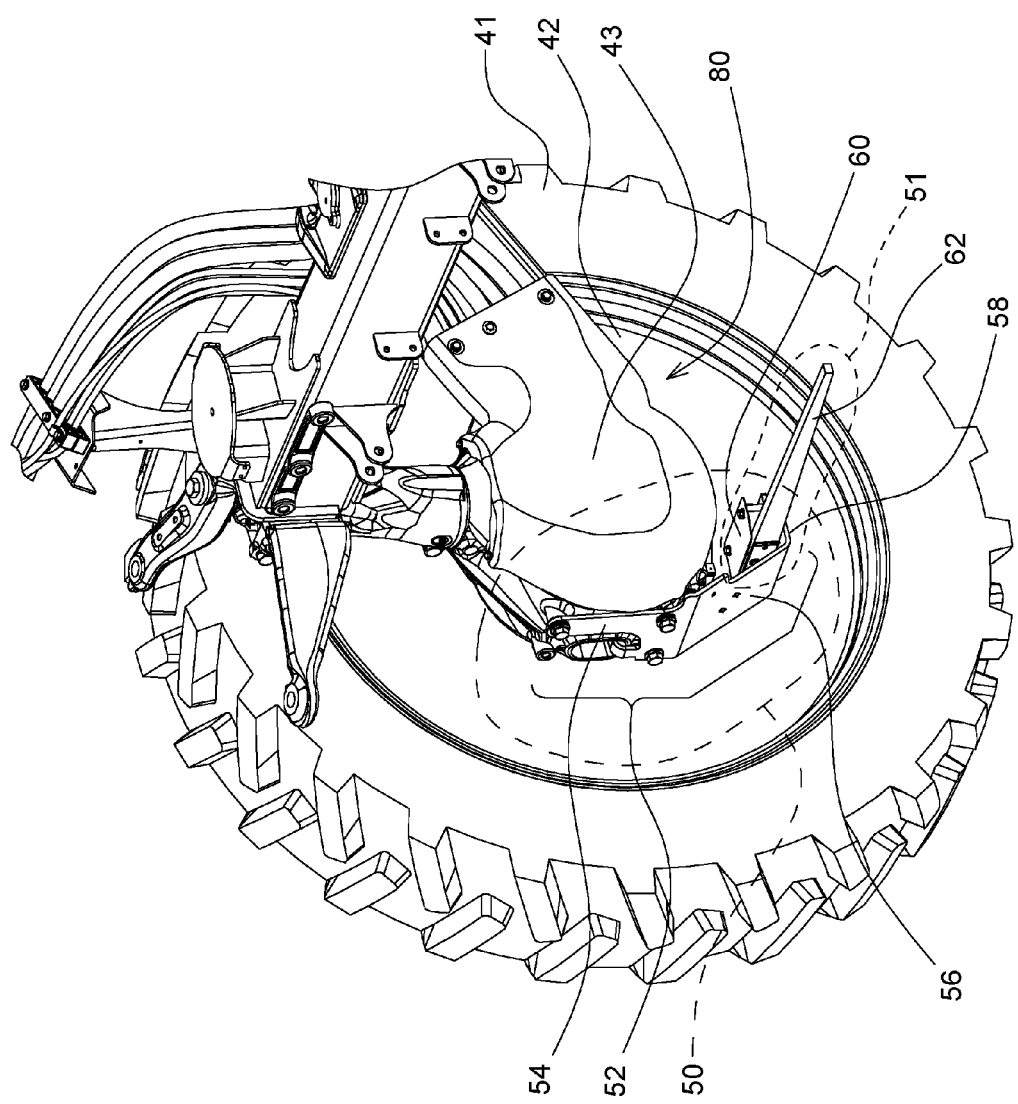

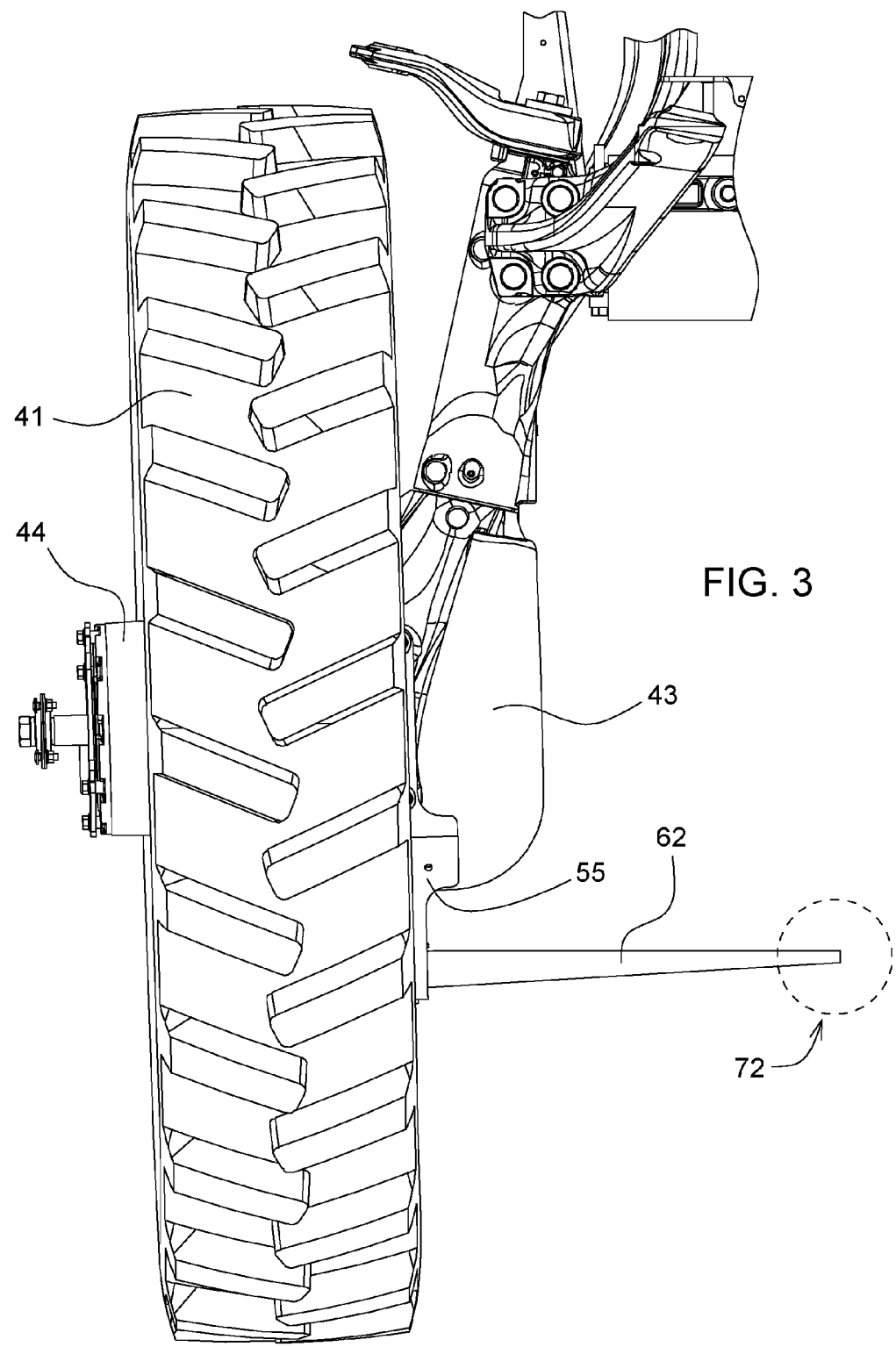

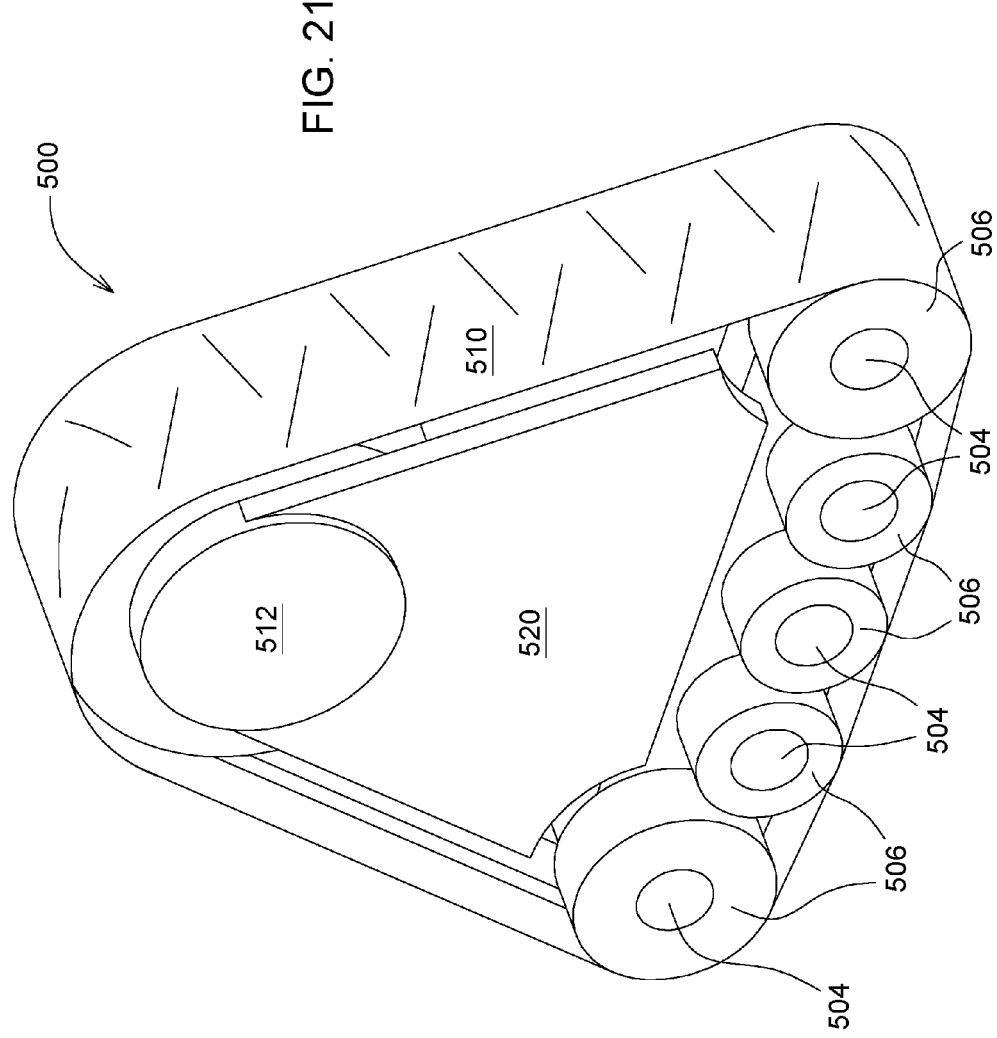

TACTILE GUIDANCE ARRANGEMENT FOR VEHICLES

RELATED APPLICATION

This patent application claims priority to U.S. Provisional Patent Application Ser. No. 62/093,898, filed Dec. 18, 2014, and entitled, Tactile Guidance Arrangement for Vehicle, the contents of which are incorporated herein by reference.

FIELD OF THE DISCLOSURE

This disclosure relates to tactile guidance devices for vehicles, especially off-road work and agricultural vehicles.

BACKGROUND OF THE DISCLOSURE

Off-road vehicles of various types, such as those used in the agriculture, construction and forestry industries are often tall and the operator is far from the ground such that navigating the vehicle over the terrain is even more difficult than navigating a passenger vehicle. Passenger cars use guidance systems to guide vehicle heading (e.g. GPS) but these guidance systems may not be sufficient for large vehicles traveling rough terrain or where the ground is covered by debris, residue, leaves and so on. Past attempts and systems address much different scenarios, and lack precision and reliability, among other issues.

SUMMARY OF THE DISCLOSURE

This disclosure relates to tactile guidance arrangements for vehicles and various mechanisms for orienting and mounting the tactile guidance arrangements.

The details of one or more implementations of the disclosure are set forth in the accompanying drawings and the description below. Other features and advantages will become apparent from the description, the drawings, and the claims.

BRIEF DESCRIPTION OF THE DRAWINGS

The details of one or more implementations are set forth in the accompanying example drawings, the description and claims below.

FIG. 2 is a partial front perspective view showing an example tactile guidance arrangement mounted at an inner wheel location of the agricultural sprayer of FIG. 1.

FIG. 3 is a partial front view of FIG. 2.

FIG. 21 is a perspective view of an example ground-engaging wheel arrangement that comprises tracks.

DETAILED DESCRIPTION

Figure 1:
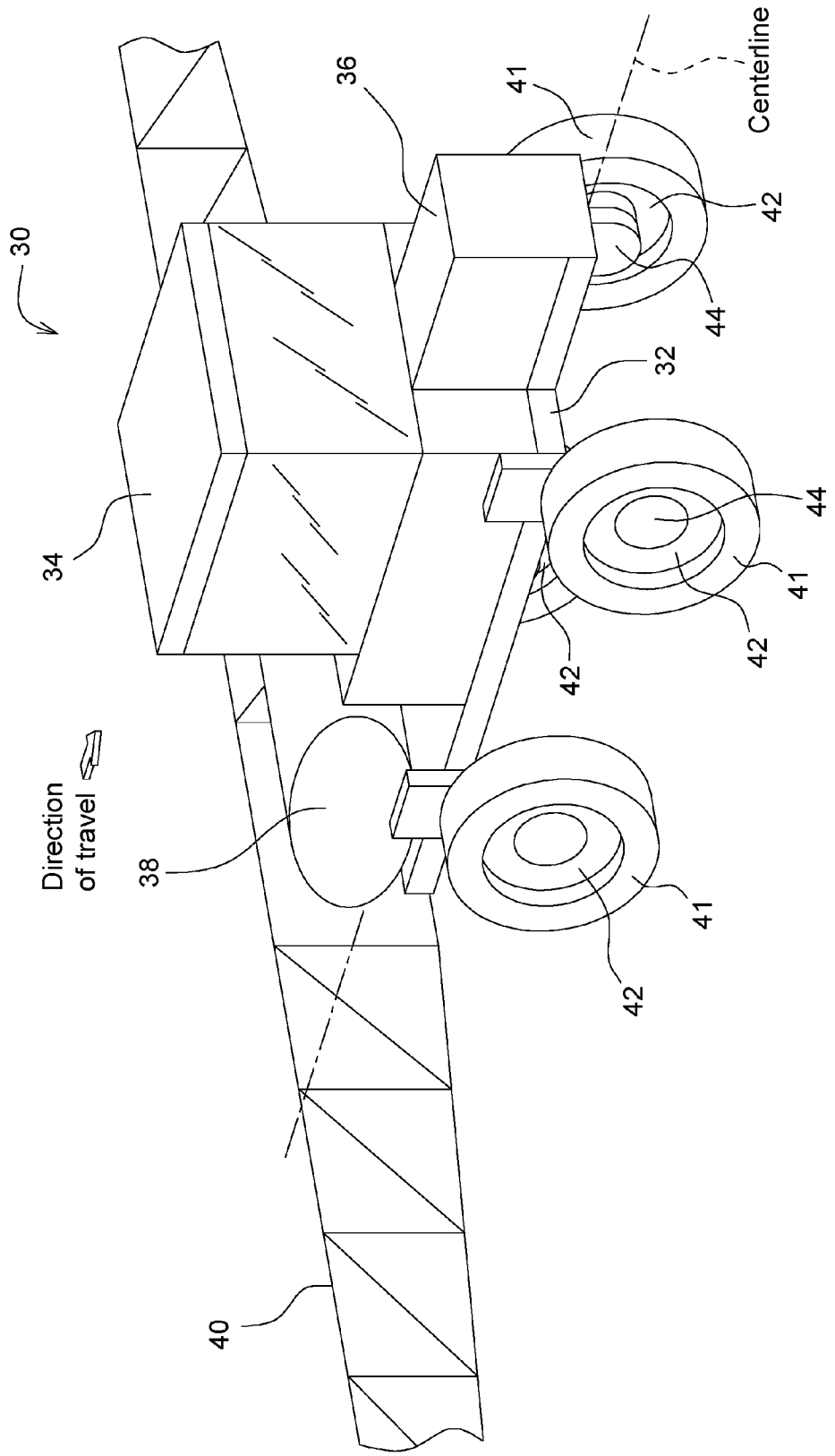
FIG. 1 is a perspective view of an example vehicle, in the form of an agricultural sprayer, having a tactile guidance arrangement.

This disclosure provides example embodiments of a tactile guidance system 51 in various tactile guidance arrangements 50 for orienting and mounting the tactile guidance system 51 on motorized vehicles such as agricultural spray vehicles and windrowers for crops. On a smaller scale, the devices can be miniaturized to help autonomous ground scouts or robots to navigate fields, lawns or gardens, vegetable patches, forest foliage and so on. The navigation devices can be used at night time or where there are crops, residue and obstacles on the ground to help agricultural, military or construction vehicles determine the location of the objects (e.g. crop rows) to navigate among the objects and crop rows.

Example embodiments of the tactile guidance system 51 include a flexible rod, protrusion or paddle (i.e. the contact or tactile device) mounted on the inner side of the front wheels of the vehicle. The paddle or rod protrudes out (e.g. perpendicularly) from the wheel and deflects when it touches an obstacle or comes into contact with something. The tactile guidance system 51 also includes a sensor that measures the amount of deflection or force of the paddle, which indicates that an object or obstacle contacted (touched or brushed against) the paddle. The embodiments include placing the tactile guidance system 51 mounted externally on the wheels of the vehicle or alternatively mounted close to a wheel (e.g. within a centimeter) on an associated wheel motor casting or frame associated with the particular wheel such that the tactile devices are protected by being positioned in the hollow or inset of the wheels. In some embodiments, each of the front wheels (usually two wheels, first in the direction of travel) of a vehicle has an associated guidance device; and the wheels are independently motorized (e.g. hydraulically controlled) independent of the other wheels. In smaller vehicles, the wheels are often mounted on an axle and the guidance devices are mounted ahead of the axle. The sensor information can be used in various different ways such as to direct the navigation of the vehicle or to avoid running over the crops. For example, when two paddles at the front of the vehicle are contacted, then the vehicle can be guided to drive forward symmetrically among the crop rows. Alternatively, the information from the sensors can be used to gauge the location of the plants, the crop row or distance between crop rows or plants or other obstacles. Since the tactile and sensors devices are mounted at a known distance or geometry with respect to the wheels and wheel hubs, and the size of the wheels and distance between wheels are known, the width or distances between crop rows (plants or obstacles) can be calculated from the known distances and geometry. After much experimentation, the example mountings provide superior (e.g. precise) information as to the location of the contacted objects relative to the vehicle wheel coordinates and the ground coordinates. For example, the tactile guidance components brush against leaves and stalks of one or more rows of planted crop in the case of certain agricultural vehicles, in which case the system provides width heading guidance based on the amount of occurrence of contacts, and the magnitude (degree or force) of the deflection of each contact. The arrangement can be applied for example, to agricultural vehicles, to help the operator figure out the path of the rows of planted crop or windrows, where end rows are, where ditches may be, etc., even if it is night time or there little visibility due to foliage covering the ground surface.

In some example embodiments, the tactile guidance system 51 has tactile components or structures that include rods, elongated members or paddles that project outward in the side-to-side direction of the vehicle (i.e., transverse to the path of travel). In some embodiment, the paddles are flexible or hinged to sway somewhat when contacting the guiding object(s), and thereby reduce impact damage to the paddles or the guiding object(s). The paddles are operatively coupled to a sensing device (e.g., magnetically coupled to an electro-magnetic transducer) having circuits to detect and resolve paddle displacements, and generate electric feedback signals proportional to the displacement or force of motion of the paddles. The feedback signals are used to provide operator feedback with regard to the vehicle heading so that the operator may use the information to make manual steering adjustments. More sophisticated vehicles or autonomous ground scouts (robots) with computer controlled or assisted steering may utilize the feedback signals to automatically make steering adjustments as needed to track the path of the guiding object(s).

Mounting the tactile guidance system 51 to detect objects near the ground poses risks that are overcome by the disclosed design embodiments. In the case of off-road vehicles that navigate uneven terrain, such low to the ground mounting presents a significant challenge with respect to minimizing damage to the components of tactile guidance system 51 by contact with the ground (e.g., when the vehicle traverses hills and ruts) and other close to the ground objects or obstructions that the vehicle may encounter in travel. The choice of material of the detecting device (paddle) and the housing the sensor for the paddle within the protective cavity of the wheel reduce the likelihood of damage. Adding a wheel shield or wheel guard (horizontal V-shaped rod) further reduces the likelihood of damage. In some embodiments, the tactile guidance system 51 especially the tactile device is mounted on levers that flip up or fold so that the paddle is no longer sticking out transverse to the wheel, but raised flush against the wheel or lying in the hollow of the wheel; in such a "transport" position, the vehicle can travel faster or go through mud and debris without damaging the tactile guidance system.

In certain example vehicles, especially some off-road work and agricultural vehicles, the vehicle follows a particular path of travel that tracks one or more physical objects. In the agriculture industry this includes navigating a harvesting or other machine over a field so that certain components or implements are positioned with respect to spaced apart rows of raised ground (e.g., furrows, banks, etc.) or crop (e.g., corn stalks, hay windrows, etc.) as needed to treat or process (e.g., harvest, cultivate, bale, fertilize, spray, etc.) the ground or crop. The tactile guidance system 51 sends electronic signals to local electronic circuits or to the controller for the vehicle to analyze whether an obstacle has been contacted to help the operator steer or to automate the steering of the vehicle along the object-defined path or to avoid the objects (e.g. avoid running the vehicle wheels and tire over the crops).

In some embodiments, a tactile guidance arrangement 50 is associated with and tracks one or more individual wheels of a vehicle, be it an agricultural sprayer, combine, or any other harvester or agricultural or work vehicle. Empirical study in connection with this disclosure indicates that placement of the physically interacting (tactile and sensing) components near the features effecting changes in vehicle heading (e.g., near a steerable ground-engaging wheel) improves the responsiveness and overall tracking accuracy of steering assist systems. Using one or more of the example arrangements disclosed herein, the working components of the guidance system are tied directly to one or more steerable wheels of the vehicle in a reliable manner, and thus be mounted to track the line of travel of the associated wheel or wheels specifically, as opposed to the overall heading of the vehicle.

In some embodiments, the tactile device and sensor (sensing device) are mounted directly to or coupled to one or more wheels of the vehicle. For example, the tactile guidance arrangement 50 has singled-sided tactile device components. That is, a paddle or other elongated member of the tactile guidance system 51 extends (protrude) primarily in only one sideways direction from the direction of travel of the vehicle or an associated wheel. For example, a tactile paddle has just one free end projecting out in a transverse direction either inward or outward of a wheel (i.e., toward or away from the centerline of the vehicle).

FIG. 1 illustrates an example vehicle, in the form of an agricultural sprayer 30, having a chassis 32 on which is mounted an operator cabin 34, a power head 36 including a suitable prime mover (e.g., engine, motor(s), hybrid drive, etc.), a solution tank 38, and a spray boom 40. The chassis 32 is supported off of the ground by ground-engaging wheels 42, including at least one pair (front or rear) of drive wheels and at least one pair (front or rear) of steerable wheels. In the example agricultural sprayer 30, all four wheels are powered and the front wheels are steerable. In some embodiments, the wheels 42 are coupled to the chassis 32 via wheel hubs 44, which sometimes include individual final drives that rotate the wheels 42 under hydraulic power. The steerable front wheels 42 are mounted to articulate by suitable steering mechanisms (e.g., a suitable electro-mechanical or electro-hydraulic steering system). The steering system in the example agricultural sprayer 30 are operated manually via a steering wheel in the operator cabin 34, or the steering is assisted, or controlled automatically, by computer control processing applicable steering control procedures by a master vehicle controller or by one or more controllers 48 (see FIG. 20) dedicated to the steering and/or tactile guidance systems 51 in cooperation with the master vehicle controller.

FIGS. 2-5 depict an example tactile guidance arrangement 50 that includes wheel-mounting at a side of a steerable wheel 42 (vehicle right side wheel, shown). In the illustrated example, the tactile guidance arrangement 50 is mounted to a wheel motor housing 42 that covers or hides the wheel hub (e.g. 44, 144) on the inner side (toward the vehicle center-line) of the wheel 42. The example assembly of vehicle wheel includes different components and different positions at which the assembly is mounted to the vehicle 30, the example arrangement 50 illustrated in FIGS. 2-5 includes an example mounting bracket 52, that is a single piece or an assembly of parts joined together. As shown, the mounting bracket 52 includes a mounting plate 54, a skid plate 56 and a base plate 58, that includes metal plates joined by welding or other suitable technique, or they are removably joined by rivets, threaded fasteners or other devices. The example mounting plate 54 is either permanently or removably mounted to the vehicle 30, for example, at the wheel hub 44, that includes or is formed by a final drive assembly. In the illustrated example, the mounting plate 54 is bolted to a wheel motor housing 43 of the final drive assembly for the wheel 42. In this example, the sprayer 30 has wheels 42 that are each driven by hydraulic motors that are mounted or coupled to the wheel hub 44 and braking system. The wheels 42 are controlled and move independently so that there is no axle between the front wheels like with a passenger car. In shorter sprayer vehicles, other types of vehicles or an autonomous scout, there is often a wheel axle between a pair of front wheels; and the mounting bracket 52 is mounted, for example, to a boot or CV joint of the wheel axle.

The example mounting bracket 52 supports the working components of the arrangement 50 including a sensor or sensing device 60 and a rod or an elongated paddle 62 (contact device) having a base end 70 and a free end 72. The base end 70 of the paddle 62 is attached to the mounting bracket 52 or the housing of the sensing device 60 with a bolt or other clasp. The length of the paddle 62 varies depending on its mounting location, location of the guiding objects (obstacles, crops, etc.), the roughness of the terrain and so on. However, if the control system requires that the paddle 62 remains in contact with the guiding objects during travel, the paddle 62 should intersect or extend beyond the path of the guiding objects (e.g., project through and possibly go beyond a width of a row of crop) sufficiently far so that the guiding objects contact the paddle 62 inward of the free end 72. As one example, the paddle 62 is twenty-four inches long, which is suitable for the wheel 42 of the agricultural sprayer 30 to be guided between adjacent rows of crop spaced thirty inches apart. In this case, approximately the terminal nine inches of the paddle 62 will intersect or extend beyond the guiding row of crop. The length of the paddle 62 is scaled based on an expected width of the crop rows, the crop height, size (e.g. height) of the wheels 42, and height and width of the example tires 41. Also, when the tactile guidance arrangement 50 is used on a small autonomous ground scout, the paddle 62 is scaled down based on the size (height and width) of the wheels of the ground scout.

Example embodiments for the physical configuration and operational characteristics of sensor and tactile components include the sensing device 60 as shown in U.S. Pat. No. 7,430,815, disclosing the mechanical and operational attributes of a two-prong vehicle guidance sensor and two-paddle arrangement that utilizes magnetic coupling of a magnetic field-sensing device (i.e., two Hall sensors) in the sensor and associated magnetic material or magnets mounted to an elongated resilient (and magnetically inert) tactile rod, which extends to free ends at both lateral sides of the centrally-located sensor. As described therein, the sensor, and thereby the magnetic field-sensing devices, are stationary and detect relative changes in the position of the magnets as the tactile rod comes into contact with an object, or is deflected to a greater or lesser extent by the object. The sensor then generates electrical signals corresponding to the magnetic field strength detected from the magnets. The signals from the sensor electronics is used by the vehicle steering control to correct vehicle heading as needed to keep the detected magnetic fields for the two magnets uniform. The entire disclosure of the '815 patent is incorporated herein by reference.

Unlike the U.S. Pat. No. 7,430,815 patent, the paddle 62 in some examples of this disclosure is configured to extend transversely only to one side of the associated wheel 42; that is, the paddle 62 is single-sided (single-ended) in that it extends to one side of the sensing device 60, which in the illustrated example is transversely inside, or inward toward the longitudinal center-line of, the vehicle 30. In other example embodiments (e.g. FIG. 7), the paddle 62 and sensing device 60 protrude outward of the vehicle wheel 42. With either single-sided or single-ended paddles, if the sensing device 60 operates by magnetic-field detection, the sensing device 60 has a single magnetic field-detecting device (e.g., Hall sensor), and the paddle 62 includes a single magnet. Thus, deflection of the paddle 62 by objects to a single side of the wheel 42 is used to effect a single-sided feedback signal, which the controller 48 uses to assist in steering of the vehicle. For example, by maintaining the single paddle 62 in contact with one or more guiding objects (e.g., consecutive stalks of corn), the variation in paddle deflection that may arise from the paddle 62 being contacted closer to or farther from its free end 72 is used to guide steering, for example, by the controller 48 working to maintain a feedback signal corresponding to a targeted average deflection of the paddle 62. In other embodiments, two or more magnets and magnetic field-detecting devices are used (e.g. FIG. 8). A two-pronged or two-paddle arrangement provides more information than a single-sided one-pronged device, and also provides a cross-check and redundancy.

Although only one tactile guidance arrangement 50 on only one vehicle wheel is shown in FIGS. 2-5 and is sufficient in many situations for guidance of the vehicle 30, a second example arrangement (or more) is mounted to another wheel (or other wheels), and be oriented to extend either transversely inwardly or outwardly. Using one or more additional tactile guidance arrangements 50, properly positioned, gives the system multiple inputs, which will give feedback information and signals associated with opposite (left and right) sides of an object or different (e.g., parallel) objects. For example, two identical (but mirrored) arrangements 50 are used, one mounted on each of opposite left and right front steerable wheels 42, such that the two paddles 62 both extend inwardly, towards each other. The feedback signals generated according to deflection of the pair of paddles 62 is then used by the controller 48 to control vehicle steering by maintaining uniform (or near uniform) left and right feedback signals or an averaged combined feedback signal corresponding to a targeted average deflection of the two separate paddles.

Although not shown, in another embodiment, the tactile guidance arrangement 50 is mounted to the outside of the wheel 42, for example, either by mounting it to a non-rotating (but pivotal with the wheel) wheel hub that protrudes through the center of the wheel 42, or by modifying the mounting bracket 52 to include an elongation or addition of a plate, rod or other extension arm member that extends from the mounting plate 54 outward over or around the front or back of the wheel 42 so that the skid plate 56 and the base plate 58, and thereby the sensing device 60 and paddle 62, are disposed to the outside of the wheel 42. The sensing device 60 and paddle 62 components are configured uniquely for vehicle left or right and inner or outer mounting configurations, or they are configured interchangeably by simply inverting their horizontal orientations.

Moreover, the deflection of the paddle 62 (i.e., the change in position of the magnet(s) relative to the field-detecting sensor device(s)) is effected in various ways. For example, the paddle 62 is flexible and resilient, such as made of an elastomeric material, sometimes with rigidifying structures embedded or insert-molded therein. In other examples, the paddle 62 is pivotally mounted (e.g., by a hinge) with respect to the sensing device 60 so that the paddle 62 does not bend, and is made of various rigid (and possibly magnetically inert) materials. In other example embodiments, instead of a single-sided single prong one rod, there are single-sided multi-prong rods or a circular device for the rod. The upper and lower of the multi-prong rod or the circular device provide an indication of the height of the obstacle encountered (e.g. crop height).

In the example illustration, the tactile guidance arrangement 50 is mounted to the wheel hub 44 to position the paddle 62 in a low-to-the-ground position (e.g., about 5-20 inches vertically above the ground contact patch of the tire), allows contact with grounded guiding objects that is at least as tall as the height of the paddle 62. Moreover, the tactile guidance arrangement 50 is mounted to the wheel hub 44, which, while not-rotating with the wheel 42, turns (i.e., changes orientation or heading) with the wheel 42 as it is steered. The arrangement 50 is thus configured and oriented to follow the line of travel (or wheel heading) of the wheel 42 directly, as opposed to the overall (vehicle heading) or travel direction of the vehicle. In this way, the disclosed arrangement is capable of providing more accurate and precise feedback signals, which improves the responsiveness and accuracy of the steering correction, especially in computer-controlled applications.

Figure 2A:
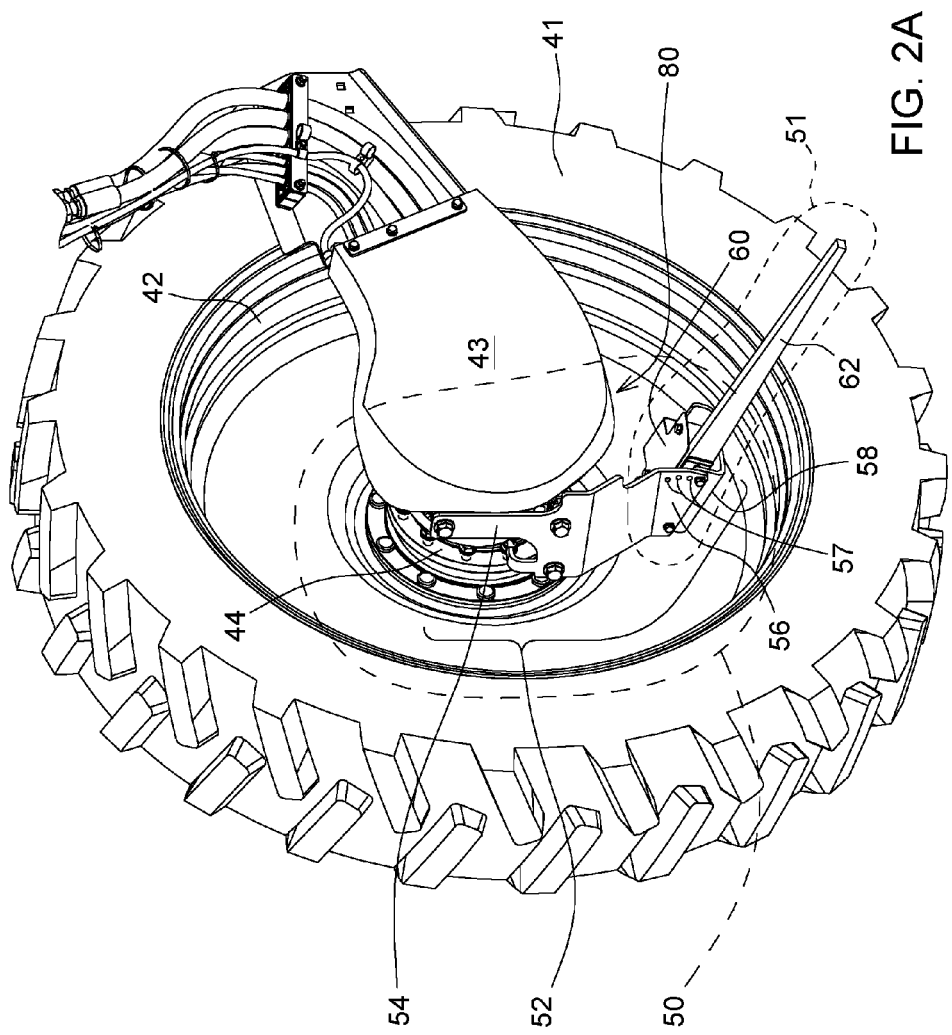
FIG. 2A is a partial front perspective view showing another example tactile guidance arrangement of FIG. 2.
Figure 2B:
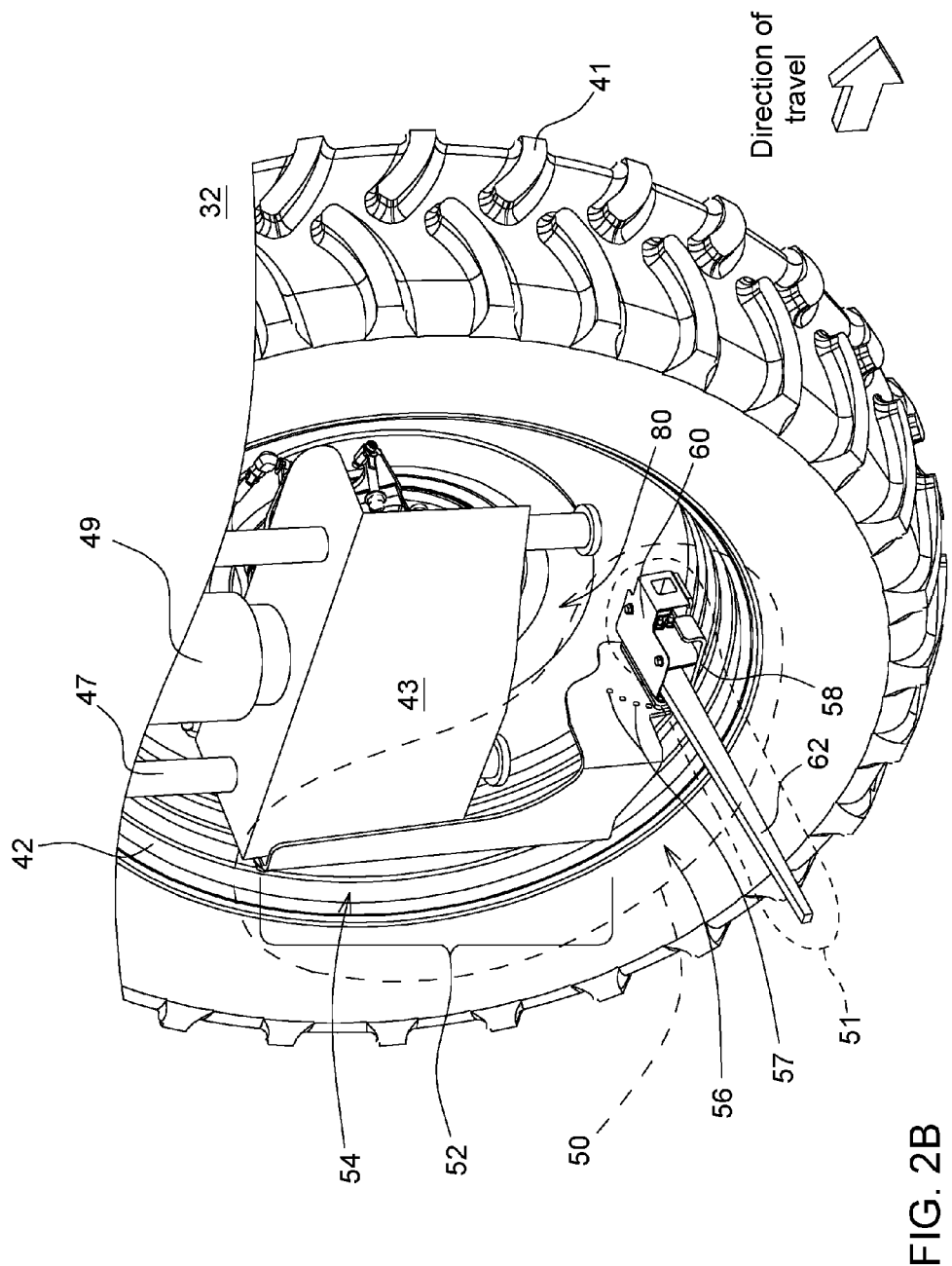
FIG. 2B is a partial front perspective view showing another example tactile guidance arrangement of FIG. 2.
Figure 4:
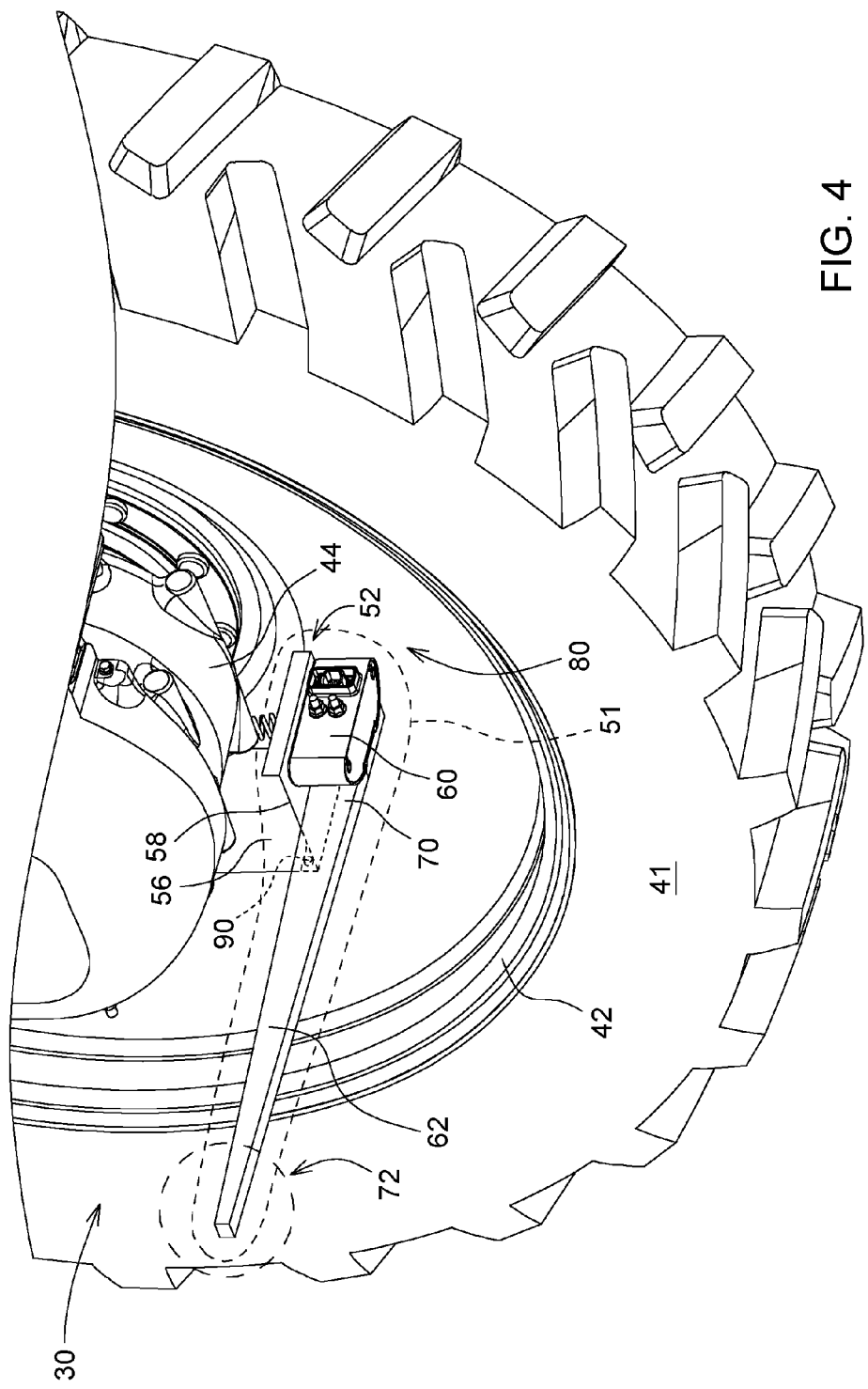
FIG. 4 is a partial rear perspective view of FIG. 2.

In some example embodiments, the height above ground of the tactile device (paddle 62) depends on or scales with the thickness of the tires 41 or the wheel 42, and with the crop height. For additional flexibility, as shown in FIGS. 2A and 2B, there are multiple slot holes 57, each located at different heights from the ground, holes to which the tactile guidance system 51 can be mounted or bolted or slotted into. Depending on the height of the crops or the obstacles, an operator can adjust the height of the tactile guidance system 51. The slot holes 57 and bolts are one example of a manual method of adjusting the height. For tool-less methods, a dowel pin or clip pin is used to mount the tactile guidance system 51. The example pin is pulled out, the guidance system 51 is moved up or down to another slot hole 57 and the pin is pushed back in to keep the system 51 in place. As an example of a remotely or electronically controlled method, the tactile guidance system 51 is mounted on an electrically activated slide latch or slide switch or a ramp switch. The tactile guidance system 51 is moved up and down based on an operator control signal, remotely, from the cabin 34 or elsewhere. If there are rocks, end-rows, ruts, etc., the operator can move the tactile guidance system 51 to a safer distance from the obstacles. In some embodiments, there is also a folding feature or transport mode, where there is, for example, an electrically or manually pivotal or rotatable diskette between the tactile guidance system 51 and the mounting bracket 52's end plate 59. The tactile guidance system 51 can be raised up so that the paddle 62 is positioned safely flush against the wheel motor housing 43, instead of protruding out from the wheel 42.

Figure 5:
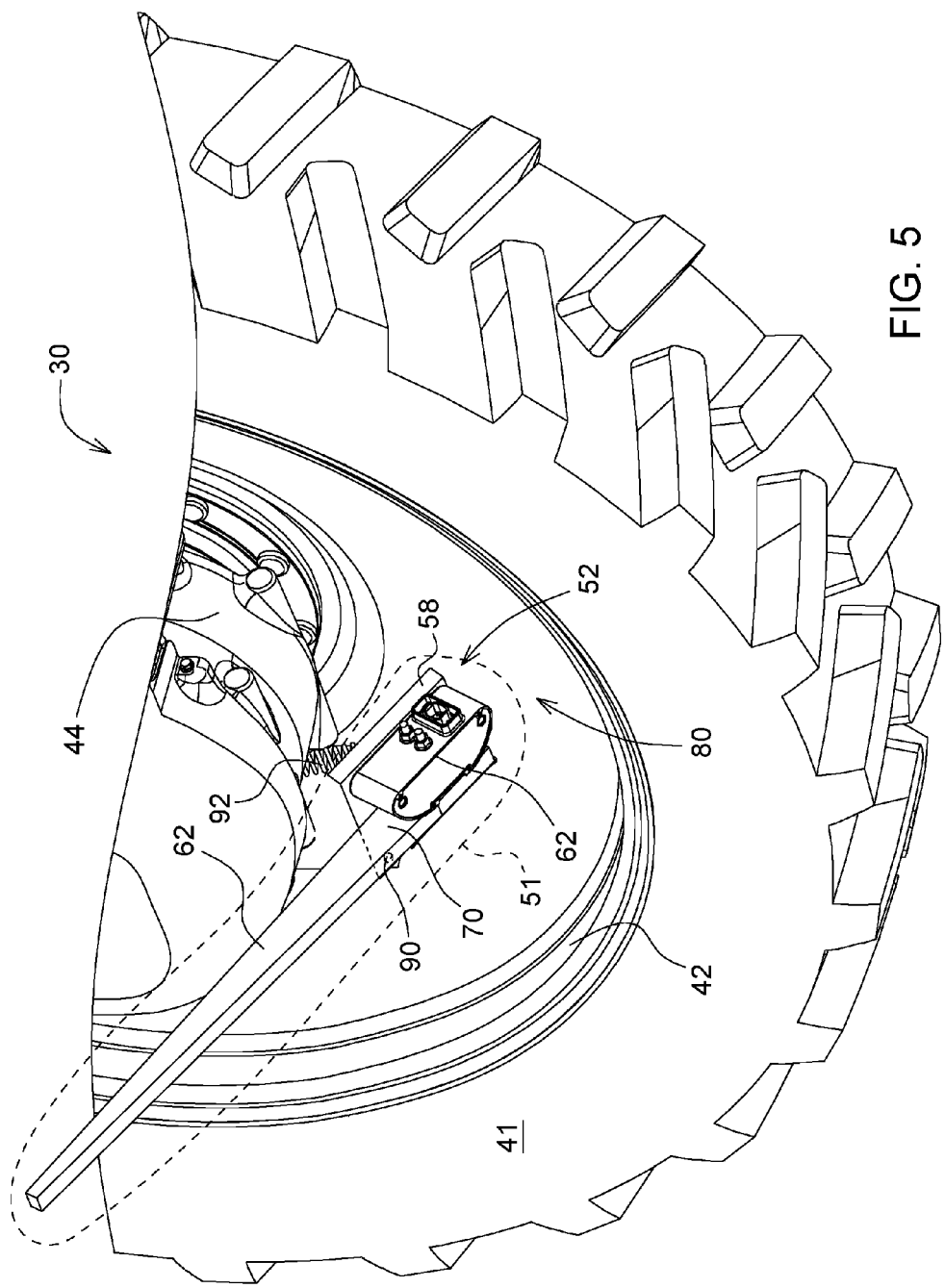
FIG. 5 is a view similar to FIG. 4 showing an example break-away position of certain components of the tactile guidance arrangement of FIG. 2.
Figure 5A:
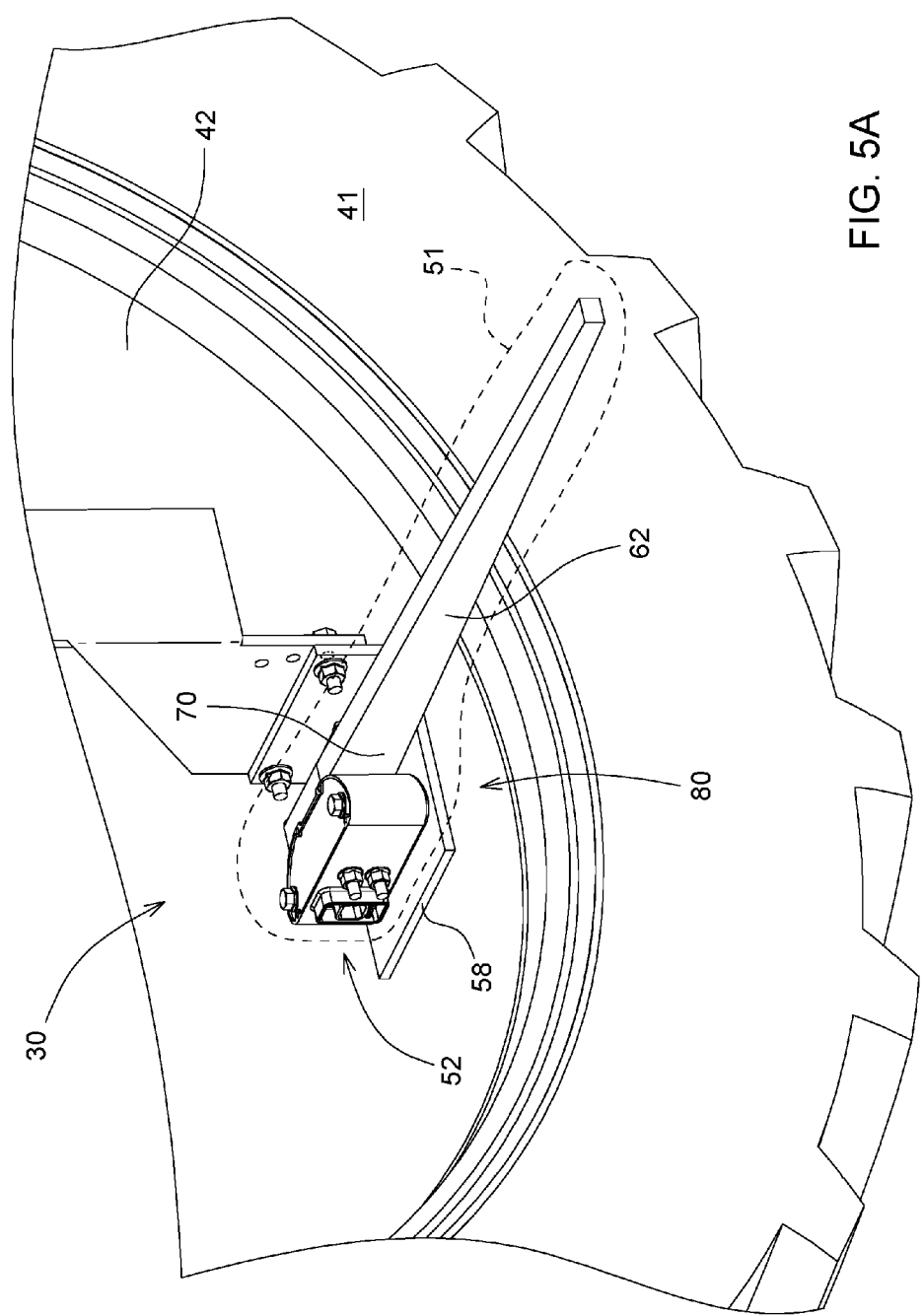
FIG. 5A is a view similar to FIG. 5 showing a variation of the example break-away position of certain components of the tactile guidance arrangement of FIG. 2.

The configuration of the tactile guidance arrangement 50 resists collateral damage, especially to the paddle 62 and the sensing device 60, from contact with uneven terrain or other objects (including the guiding objects) in various ways. For one thing, the example mounting bracket 52 is rigid and includes a skid plate 56, which provides a protective barrier for the sensing device 60, which is mounted direction behind the skid plate 56. Also, the configuration and mounting location of the mounting bracket 52 position the sensing device 60 and the base end 70 of the paddle 62 within a wheel cavity 80 (inset of the wheel 42) formed between the wheel hub 44 and the outer rim (or tire 41) of the wheel 42. As such, the wheel 42 itself acts as a further protective barrier from contact with the terrain or other objects during travel. The size of the cavity 80 and the extent to which the sensing device 60 and base end 70 of the paddle 62 are shielded by the wheel 42 varies based on wheel size, wheel hub size and/or mounting location of the mounting bracket 52. In other embodiments, the mounting bracket 52 and/or the connection of the paddle 62 provide for controlled release or break-away when impacted by the ground or other objects. For example, a hinge or pivot connection 90 is provided between the skid plate 56 and the base plate 58, as shown in FIG. 5. Depending on the orientation of the pivotal (or other) connection, the arrangement includes a break-away action in a horizontal direction, a vertical direction or other direction. The example illustrated in FIG. 5 permits the paddle 62 (and sensing device 60 and base plate 58) to pivot about a longitudinal axis that allows for break-away in the vertical dimension, when the arrangement 50 is impacted by the ground or other objects so as provide an upward impact force. As noted, by providing a pivotal connection about various vertical axes, lateral and longitudinal break-away is achieved. An example spring 92 is included to provide a biasing force returning the broken-away components to their original orientation. In yet another example embodiment, the pivotal connection includes an electrically-controlled lever; one end of the tactile guidance system 51 is attached to the lever. During road or highway transport of the vehicle, the lever pivots the tactile guidance system 51 and flips the system 51 up or folds it into the cavity 80 to avoid possible damage to the paddle 62.

Figure 6:
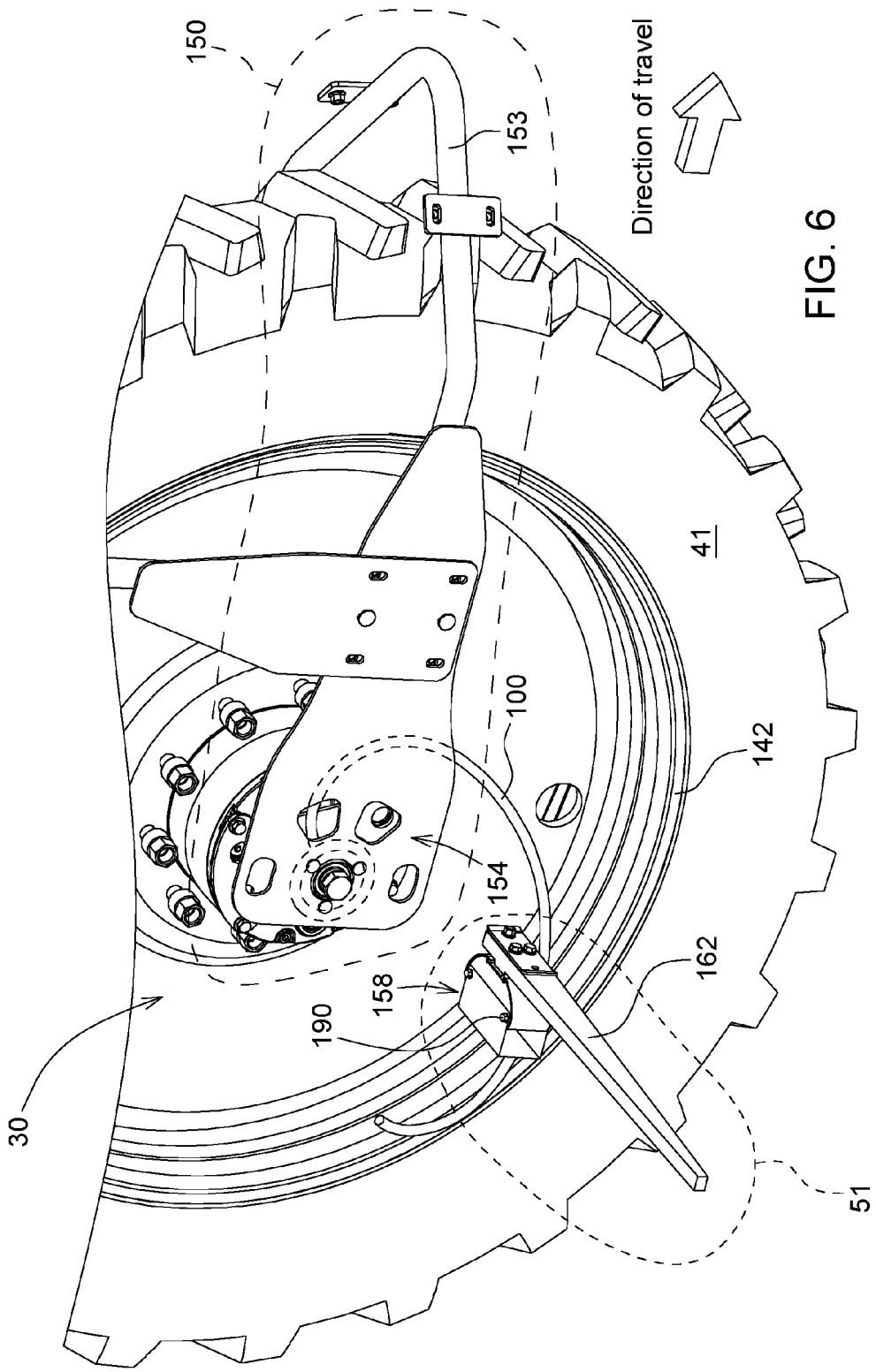
FIGS. 6 and 7 are partial perspective views showing another example tactile guidance arrangement mounted at an outside location of the agricultural sprayer of FIG. 1, the figures showing two different mounting orientations of this arrangement.
Figure 7:
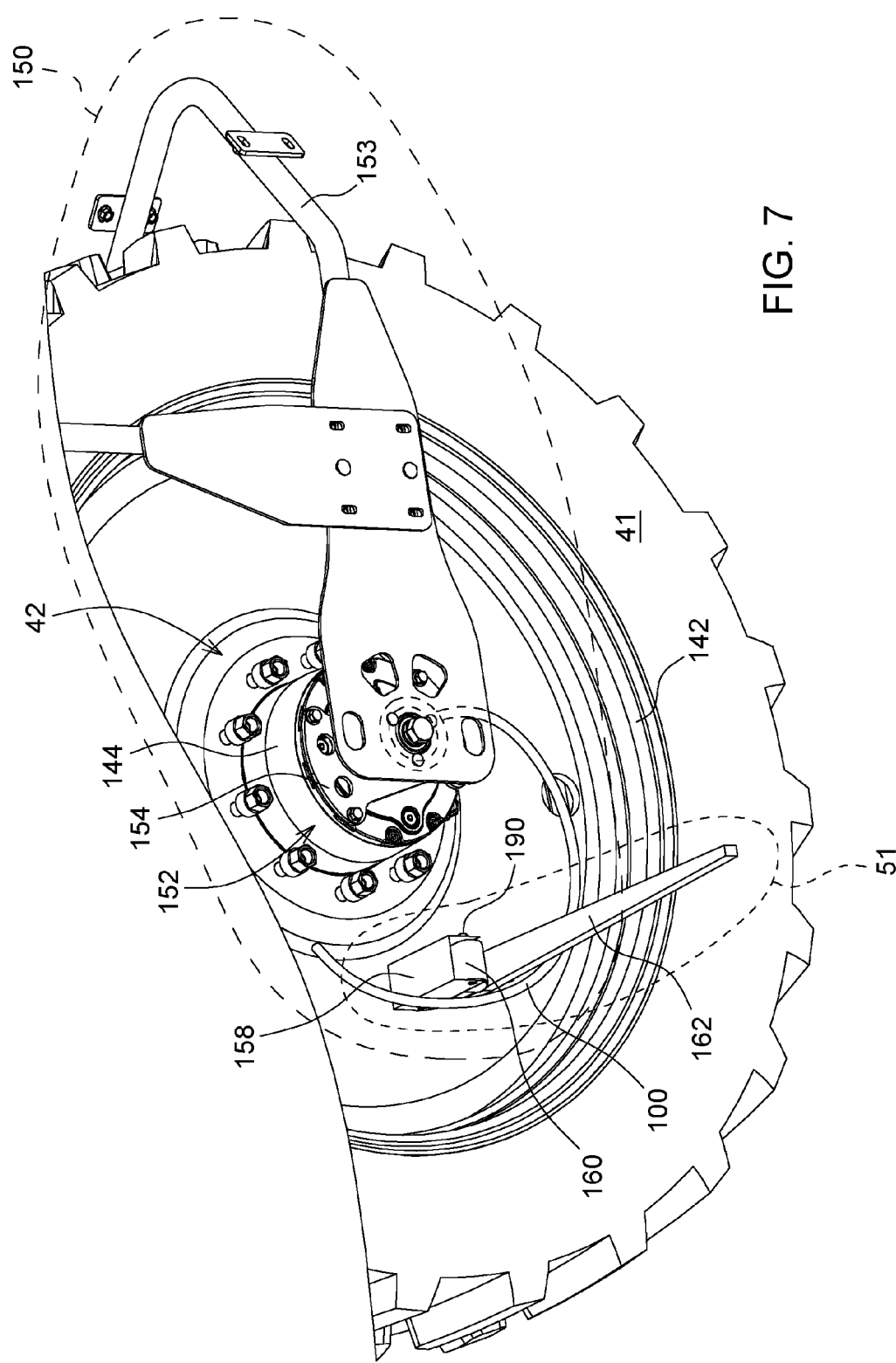
Figure 8:
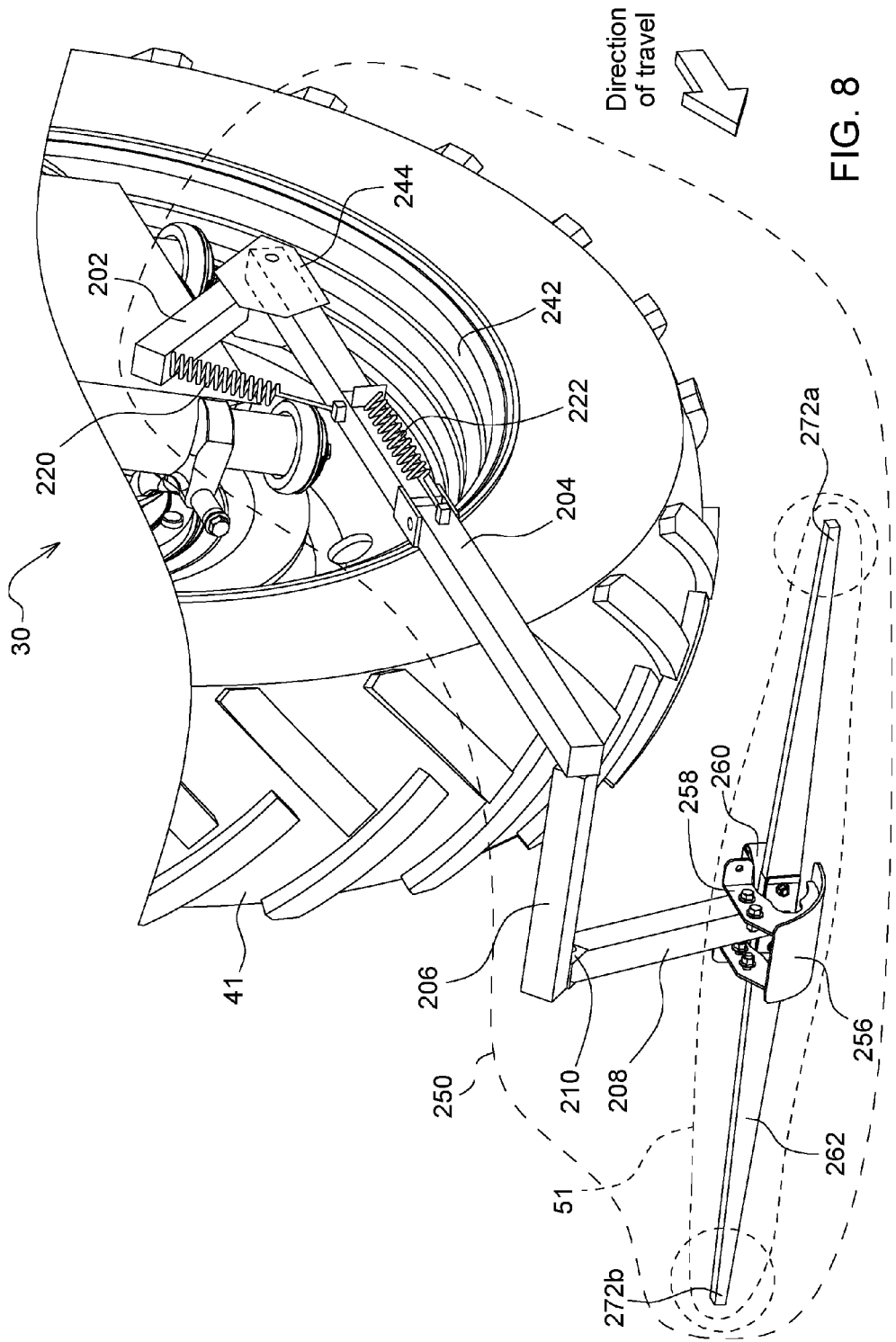
FIG. 8 is a partial front perspective view showing another example tactile guidance arrangement mounted at a front-of-wheel location of the agricultural sprayer of FIG. 1.
Figure 9:
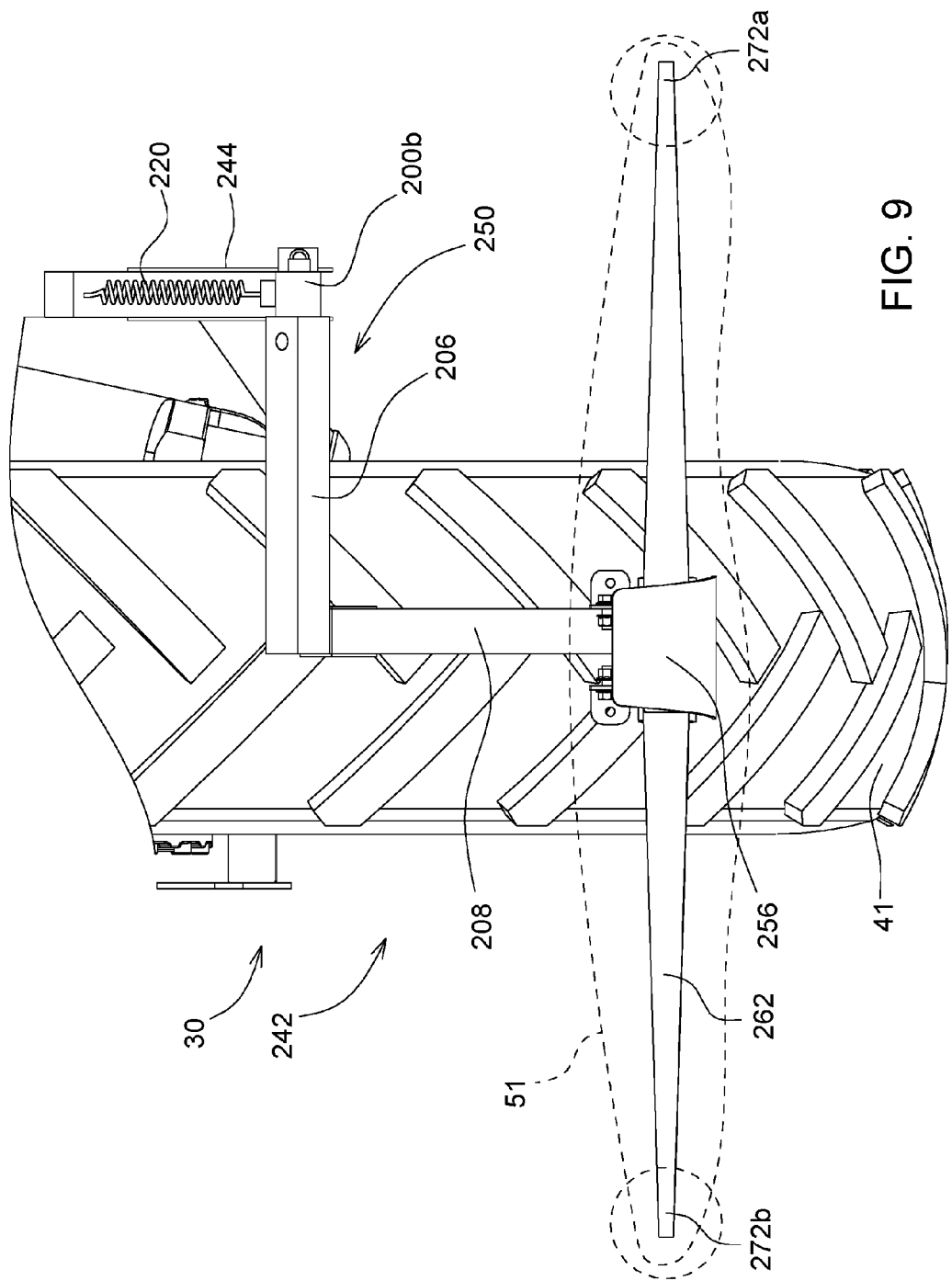
FIG. 9 is a partial front view of FIG. 8.
Figure 10:
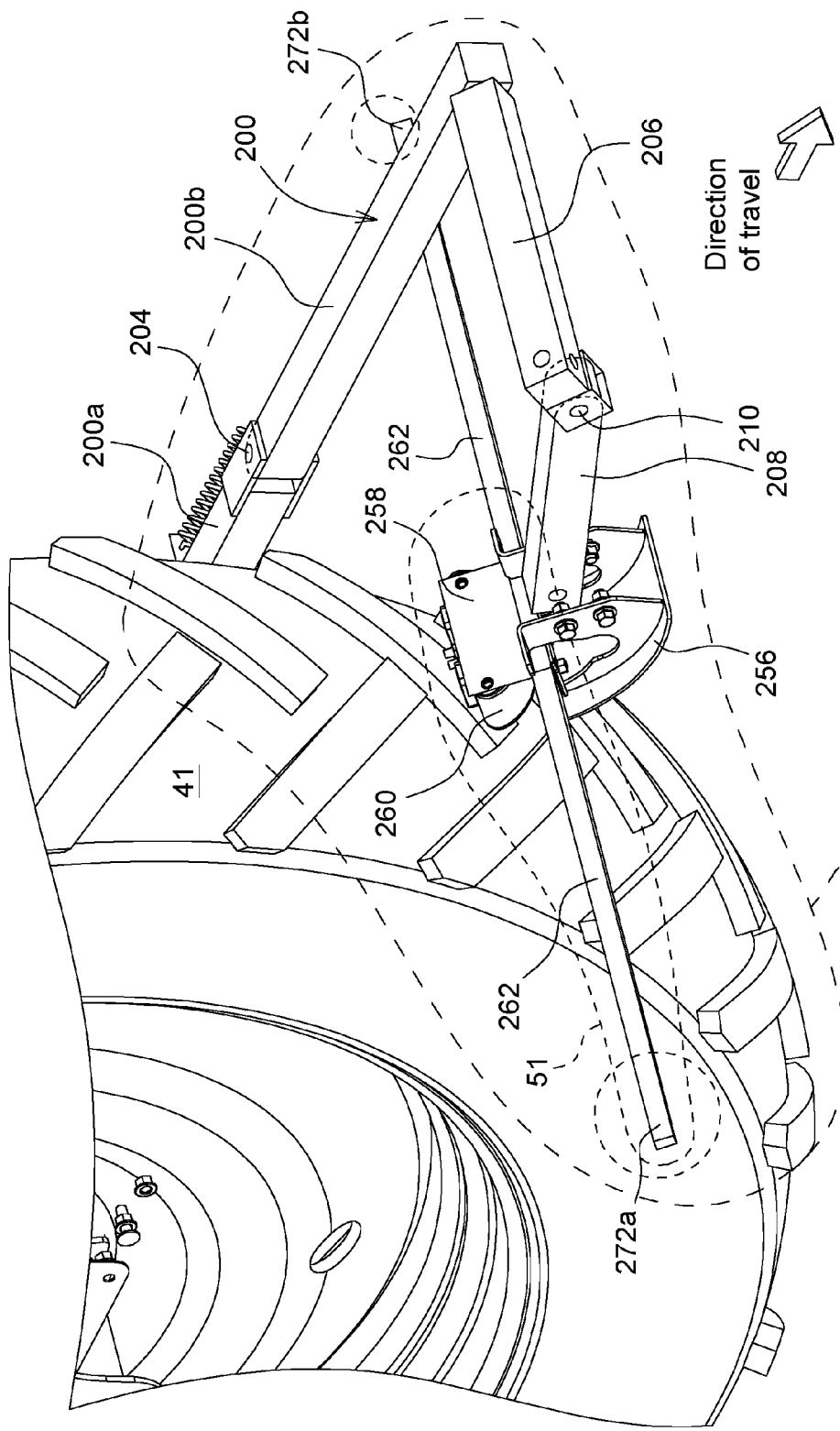
FIG. 10 is a partial perspective view of FIG. 8 shown in an example break-away position.
Figure 11:
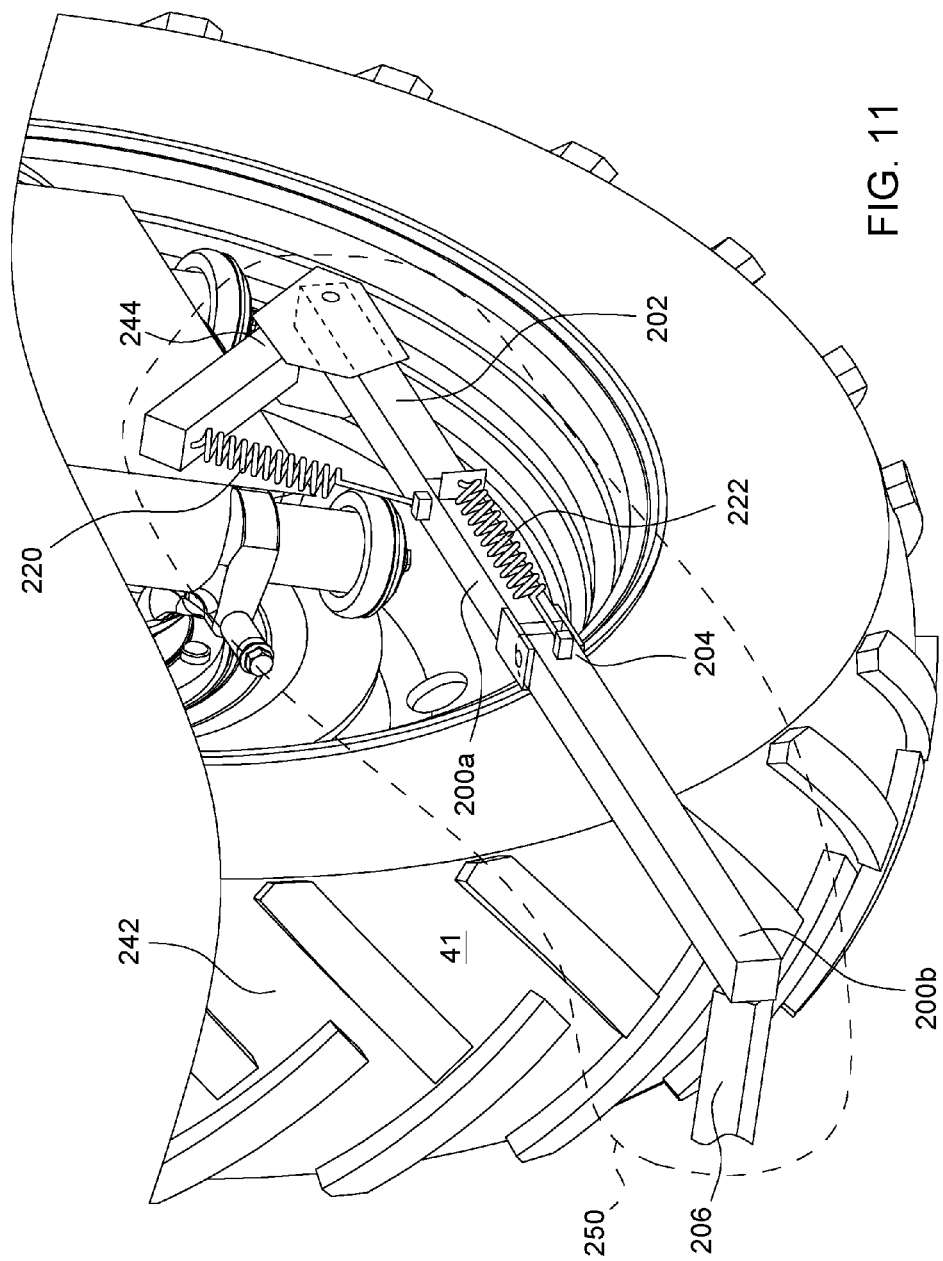
FIG. 11 is another partial perspective of FIG. 8.
Figure 12B:
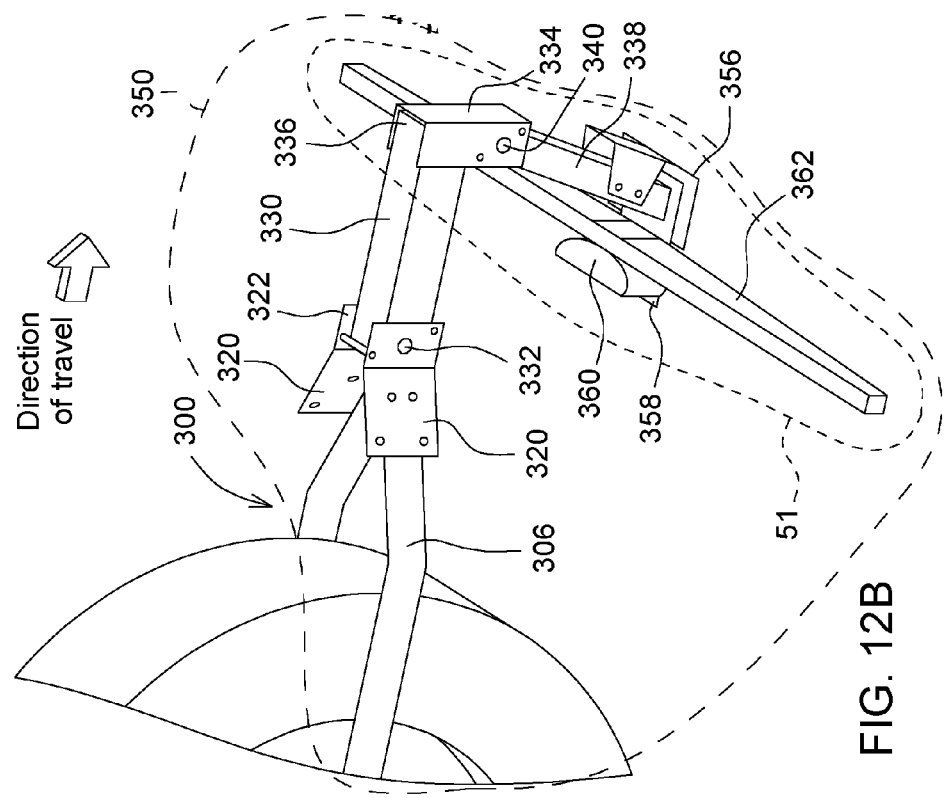
FIGS. 12A and 12B are partial front perspective views showing another example tactile guidance arrangement mounted at a front-of-wheel location of the agricultural sprayer of FIG. 1, shown with a wheel cover removed in FIG. 12B.
Figure 12A:
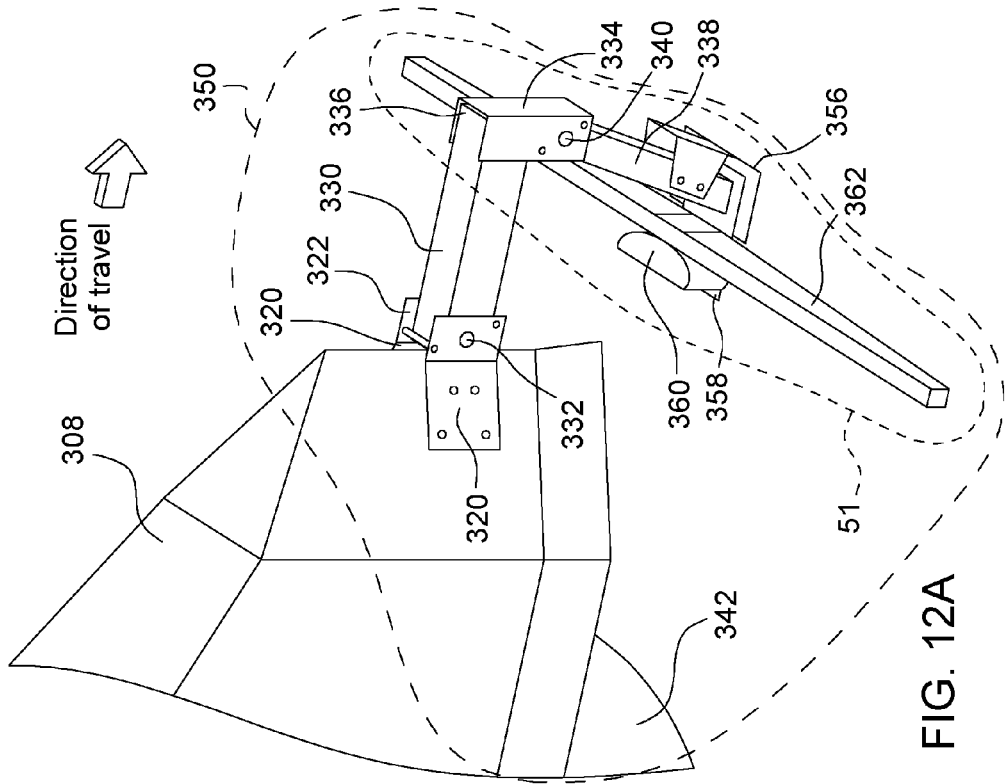
Figure 13:
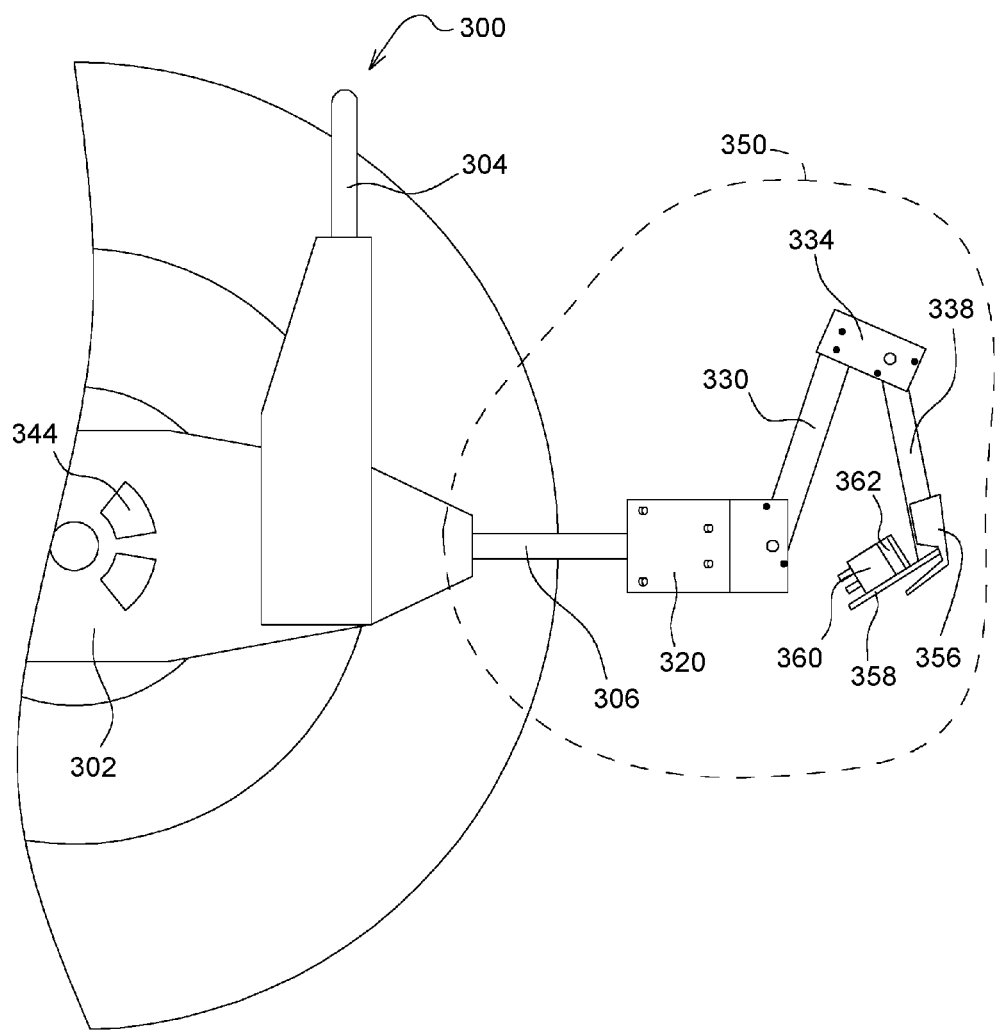
FIG. 13 is a side view of FIG. 12A.

FIGS. 6 and 7 illustrate an additional example of an inside or outside wheel-mounted tactile guidance arrangement 150. In this example, a wheel hub 144 is mounted through a central opening in a wheel 142. Another example mounting bracket 152 includes a mounting plate 154 that bolts to the wheel hub 144, an extension rod 100 mounted to the mounting plate 154, and a base plate 158 mounted to the extension rod 100 and supporting a sensing device 160 and a single-sided paddle 162. The example base plate 158, the sensing device 160, and/or the paddle 162 is mounted to the extension rod 100 at a pivot connection 190 to allow the paddle 162 (at least) to break-away, as needed. The mounting bracket 152 is shown as mounted to an outside of the wheel 142; however, inside mounting is also achieved with this arrangement 150. As illustrated, the mounting bracket 152 straddles over an example tire 143 for the wheel 142 so that the bracket 152 is coupled to both the inside and outside of the wheel hub 144. A horizontal bar 153 goes transversely across the tire 143 (straddles over the tire, external to the tire) and the bar 153 also serves as a wheel shield or tire shield. The bar 153 would encounter the objects and crop leaves before the single-sided paddle 162 would.

The example mounting bracket 152 is mounted to the wheel hub 144 in different orientations. In the orientation shown in FIG. 6, the paddle 162 is positioned low to the ground, such as is useful when providing forward or reverse travel guidance. In this orientation, the pivot connection 190 rotates about an upright or vertical axis so as to all for longitudinal (e.g., rearward) break-away action. In the orientation shown in FIG. 7, the paddle 162 is positioned higher off of the ground (e.g., above the wheel hub 144), which is useful when providing certain height or depth guidance for the vehicle 30. In this orientation, the pivot connection 190 rotates about a horizontal and longitudinal axis so as to allow for vertically upright (e.g., upward) break-away action.

Like the prior example arrangement 50, a single arrangement 150 is mounted at one wheel 142, and single-sided feedback signals from the sensing device 160 is used by a controller to provide steering correction, for example, based on maintaining a target average displacement of the paddle 162. Alternatively, a second arrangement 150 (or more) is used to provide feedback information to the controller form opposing sides of one or more guiding objects in order to provide steering correction, for example, based on maintaining a target average or uniform displacement between a pair of paddles 162. Depending on the wheel shape and dimensions, the sensing device 160 and base of the paddle 162 is disposed in a wheel cavity 80, and thereby at least partial shielded by the wheel 142 itself.

Referring now to FIGS. 8-11, another example tactile guidance arrangement 250 mounted to a wheel 242 positions a sensor and paddle assembly directly in front of the wheel (in the direction of travel) to which it is associated using a bar linkage assembly. The example bar linkage assembly is formed from rigid solid or tubular bars, such as having a hollow, square cross-section, as shown. The various bars are rigidly and fixedly connected to one another, such as by welding, or one or more bars are removably connected by threaded fasteners and the like.

More specifically, the example arrangement 250 includes an extension bar 200 having one end mounted to a wheel hub 244 associated with one of the wheels 242 (left shown) of the vehicle 30. The extension bar 200 is mounted to the wheel hub 244 at a first pivot connection 202, which extends along a lateral pivot axis. The extension bar 200 is a single bar, or, as shown, it is an assembly of multiple bars, such as extension bars 200a and 200b, coupled together, for example, by a second pivot connection 204. The second pivot connection 204 includes a lateral pivot axis. The extension bar 200 extends in a forward direction. A laterally-extending crossbar 206 is rigidly connected to the extension bar 200b at one end and to the other end be connected to a second extension bar 208 spaced from the first extension bar 200. The example second extension bar 208 extends in an upright, up and down direction and be coupled at an upper end to the crossbar 206 by a third pivot connection 210, which includes a lateral pivot axis. The lower end of the second extension bar 208 includes a skid plate 256 and another example mounting bracket 258 to which a sensing device 260 and paddle 262 are mounted. The skid plate 256 and/or the mounting bracket 258 are located forward of the wheel 242 aligned with the lateral midpoint or longitudinal centerline of the wheel 242, and also include multiple connection locations to allow for various mounting heights and orientations.

The various pivot connections 202, 204, 210 provide various break-away pivots for the arrangement 250. For example, the pivot connection 202 provides an upright (e.g., upward) break-away joint. Alternatively, it also is used to move the arrangement 250 in a retracted or stowed position to elevate the sensing device 260 and paddle 262 from the ground when not in use, such as when traveling between fields. An example spring 220 is included to aid in lifting the arrangement 250 into the retracted position. Pivot connection 204 provides another upright (e.g., upward) break-away joint for raising the extension bar 200b and the second extension bar 208, and thereby the sensing device 260 and paddle 262. An example return spring 222 is included to bias and return the extension bar 200b into its downward position. Pivot connection 210 at the crossbar 206 provides a longitudinal (e.g., rearward and upward) break-away joint for the second extension bar 208 to swing the sensing device 260 and the paddle 262 backward. The assembly thus provides for independent local break-away movement at the pivot connection 210 as well as global, compound break-away movement at the pivot connections 202 and 204. In some embodiments, additional pivot connections are included to provide for other upright, longitudinal and/or lateral break-away joints.

This arrangement 250 operates in a similar manner as the others described above, including that it tracks the line of travel of the associated wheel 242 to which it is mounted. However, the sensing device 260 and paddle 262 are positioned forward of the associated wheel 242. To help reduce damage to the arrangement 250 from possible impacts, the various break-away joints allow for enhanced or extended break-away action, namely localized individual and compound global break-away movement away from both the ground and on-coming objects. Second, the paddle 262 is a double-sided paddle; that is, it has two free ends 272a and 272b that extend transversely outward at both lateral sides of the sensing device 260, and in this case, the wheel 242. The paddle 262 provides a double-sided configuration in the form of either a single, lengthier paddle that is mounted at or near its midpoint to the mounting bracket 258, or as two shorter (single-sided) paddles that have base ends mounted to the mounting bracket 258. In either case, the sensing device 260 and the paddle 262 physically interacts with different, laterally-spaced (left and right) guiding objects (e.g., crop in adjacent rows). Thus, in one configuration, the sensing device 260 has two (or more) magnetic field-detecting devices (e.g., Hall sensors), and the paddle 262 has two (or more) corresponding magnets disposed at opposite (left and right) sides of the paddle 262 relative to its midpoint where the sensing device 260 is mounted. As such, a controller performs steering corrections by maintaining uniform or a targeted average of the left- and right-side paddle displacement.

Referring now to FIGS. 12-15, another example front-of-wheel mounted tactile guidance arrangement 350 is shown, having a bar linkage assembly mounted to a wheel cover support 300, which in turn is mounted to a wheel hub 344 of an associated wheel 342. More specifically, the wheel cover support 300 includes mounting plates 302 mounted to the wheel hub 344 at the inside and outside of the wheel 342. Upright 304 and forward 306 braces, having a "V" or "U" shape bar or tubular construction, is mounted to the inside and outside mounting plates 302 to wrap around, but maintain spacing from, the wheel 342 and to which a shell-like wheel cover 310 is bolted or otherwise mounted. This arrangement 350 operates in a similar manner as the others described above, including that it tracks the line of travel of the associated wheel 342 to which it is mounted.

In some embodiments, the bar linkage assembly of the arrangement 350 includes a pair of angle brackets 320 that mount to the forward brace 306 and connect to another example mounting bracket 322. A forwardly extending tubular extension bar 330 have one end mounted to the mounting bracket 322 at a first pivot connection 332, which extends along a lateral pivot axis. The mounting bracket 322 provides multiple locations for the first pivot connection 332. The other end of the extension bar 330 connects to a union bracket 334, at a second pivot connection 336, extending along a lateral pivot axis. The union bracket 334 connects to a second extension bar 338 extending in an up and down direction and connected by a third pivot connection 340, which also have a lateral pivot axis. The lower end of the second extension bar 338 includes a skid plate 356 and another example mounting bracket 358 to which a sensing device 360 and paddle 362 is mounted. The extension bars 330, 338, union bracket 334, skid plate 356, and the mounting bracket 358 is all longitudinally aligned and located forward of the wheel 342 aligned with the lateral midpoint or longitudinal centerline of the wheel 342.

Figure 14A:
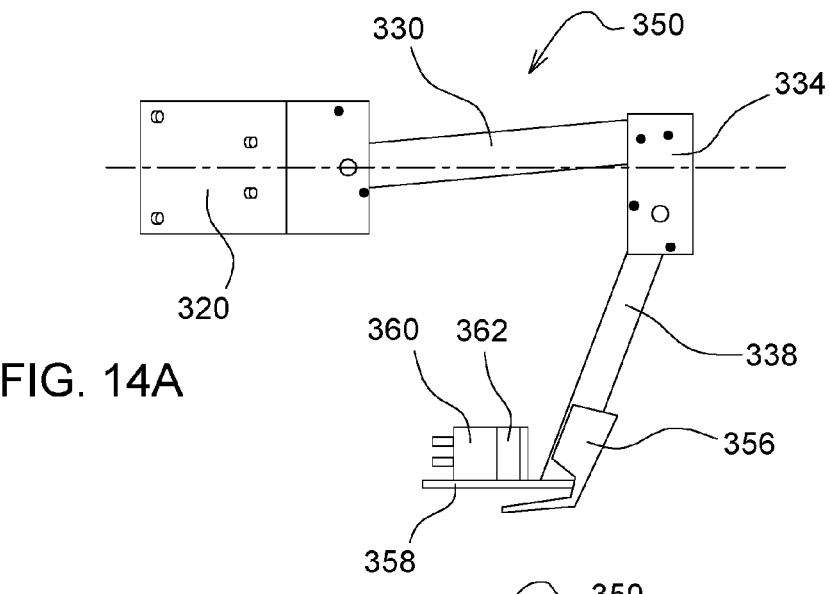
FIGS. 14A-14C are side views of FIG. 13 shown detached from the agricultural sprayer and in various example break-away positions.
Figure 14B:
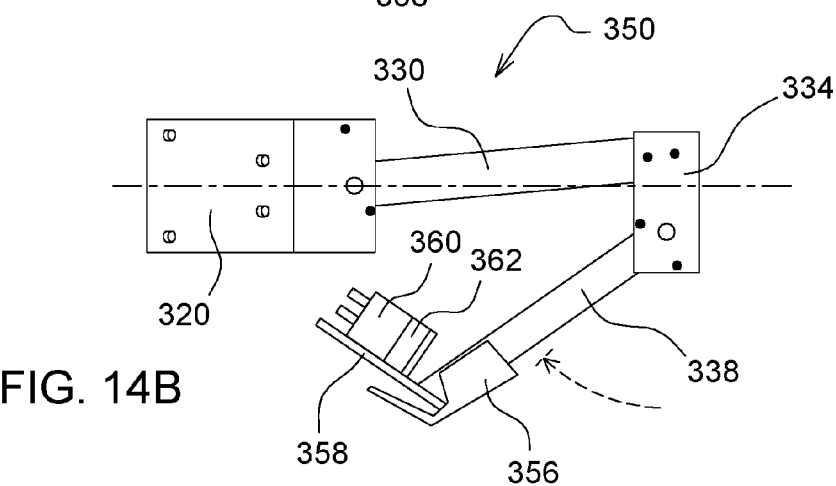
Figure 14C:
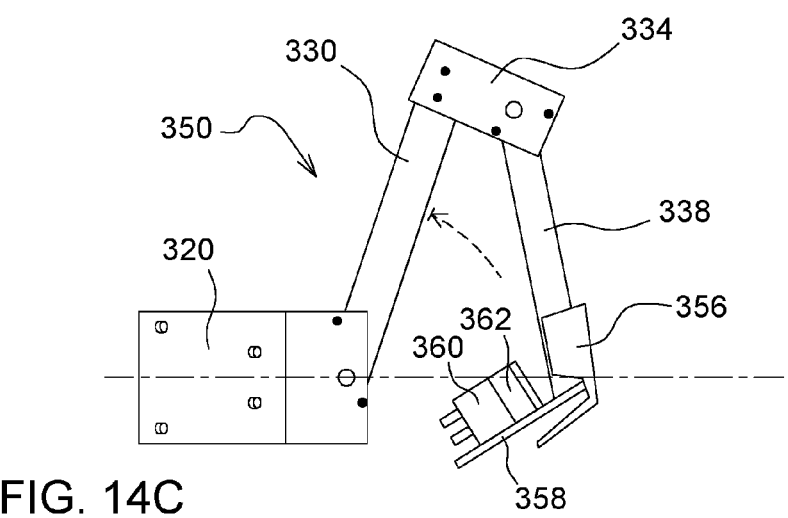
Figure 15:
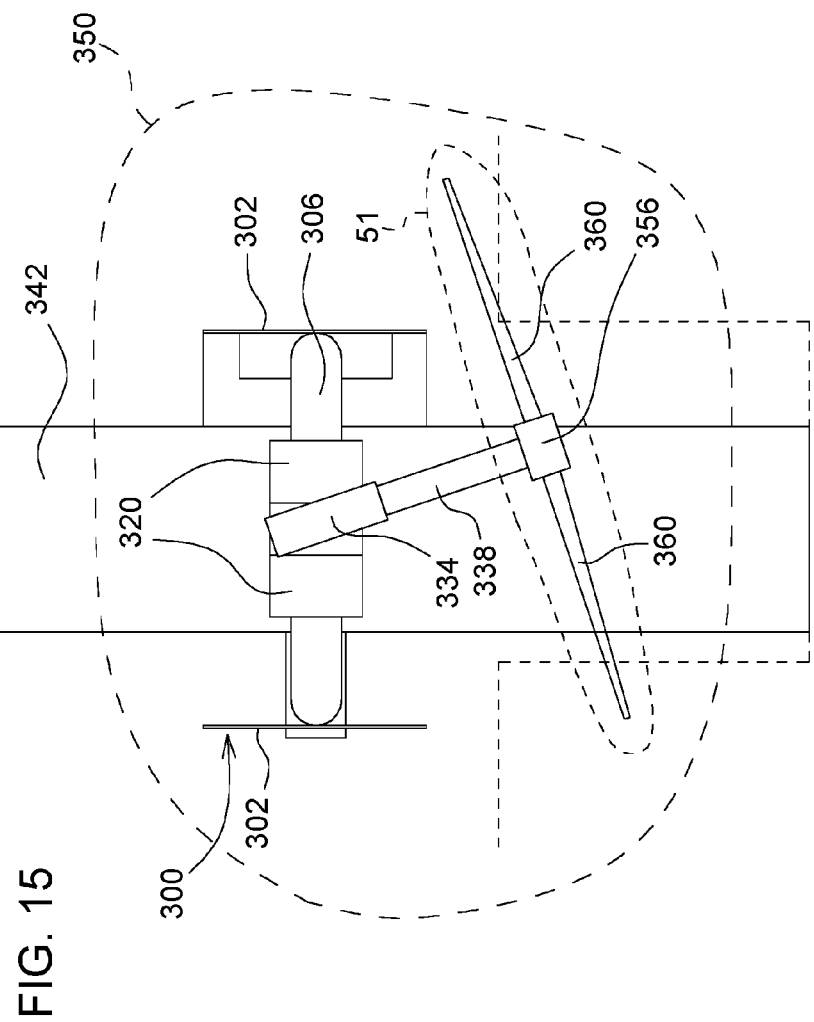
FIG. 15 is front view of FIG. 13 shown in another example break-away position.
Figure 16:
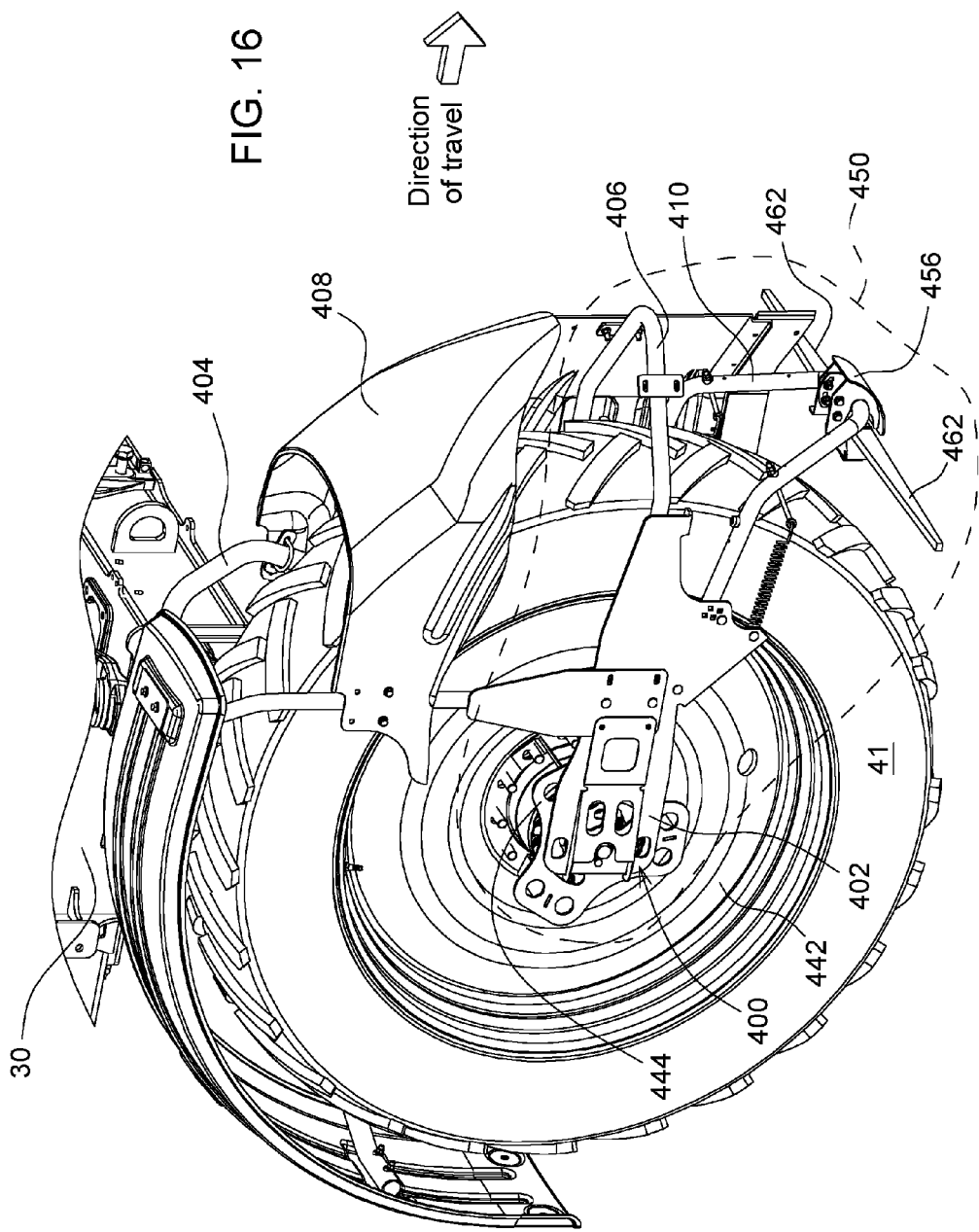
FIG. 16 is a partial front perspective view showing another example tactile guidance arrangement mounted at a front-of-wheel location of the agricultural sprayer of FIG. 1.
Figure 17:
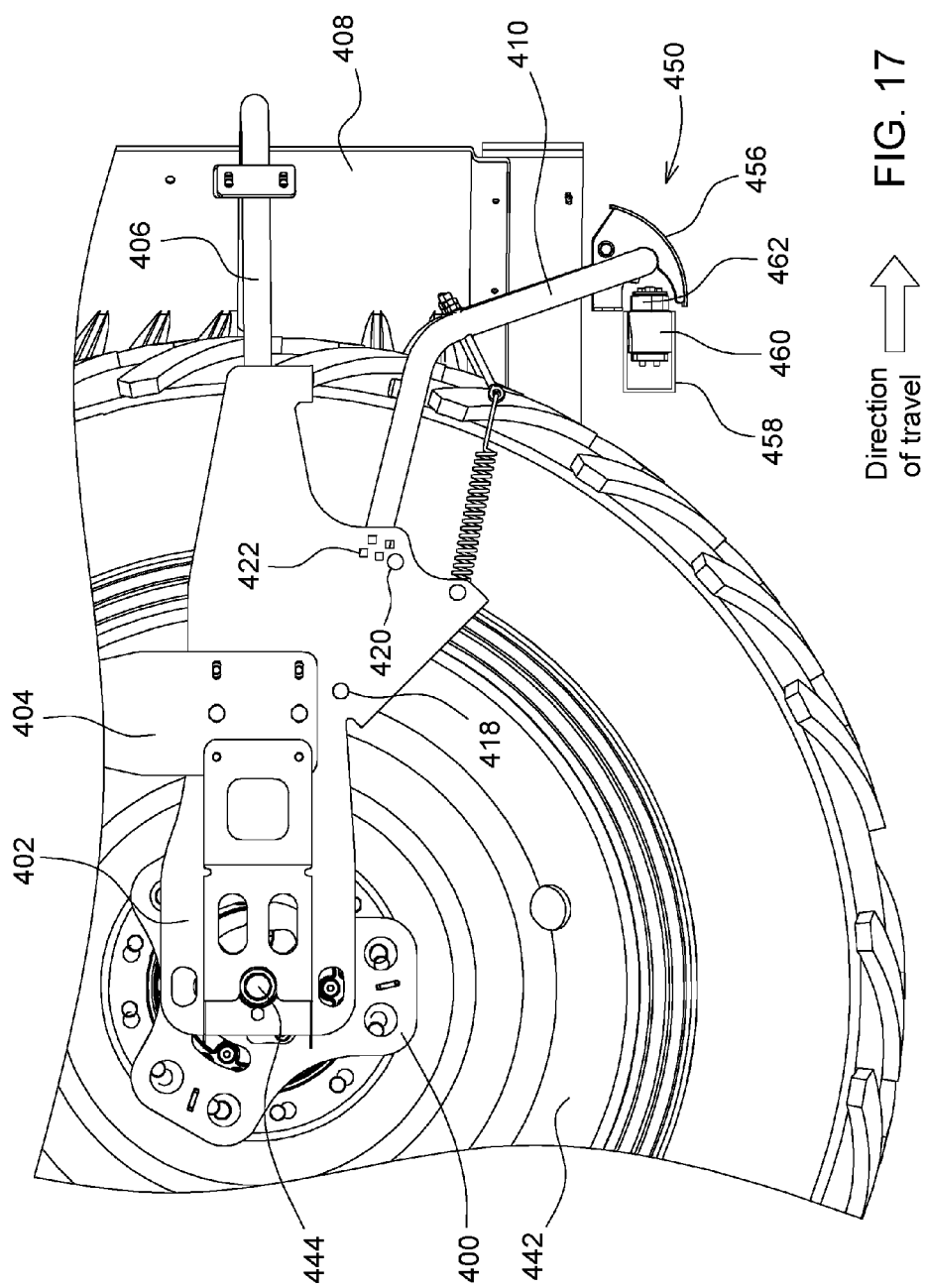
FIG. 17 is a partial side view of FIG. 16.
Figure 18:
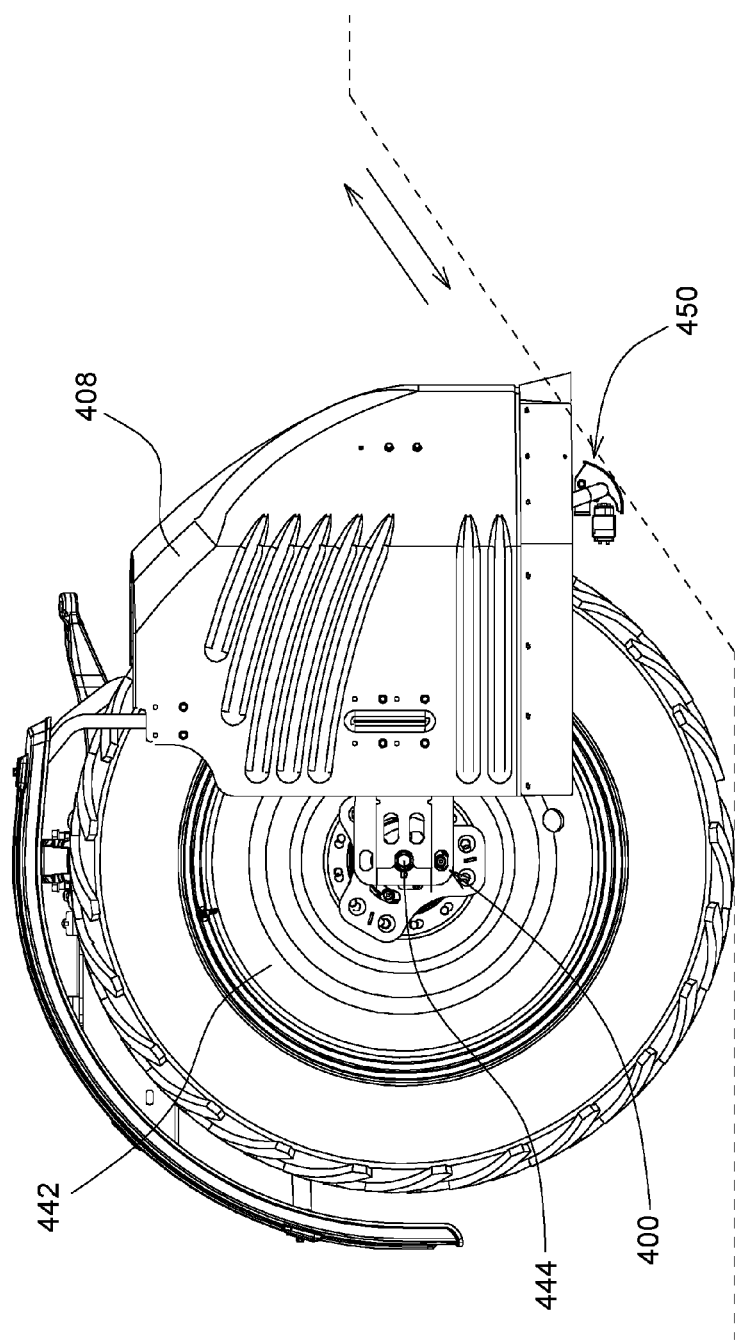
FIG. 18 is another side view of FIG. 16 illustrating schematically an example incline that the agricultural sprayer may traverse during travel.
Figure 19:
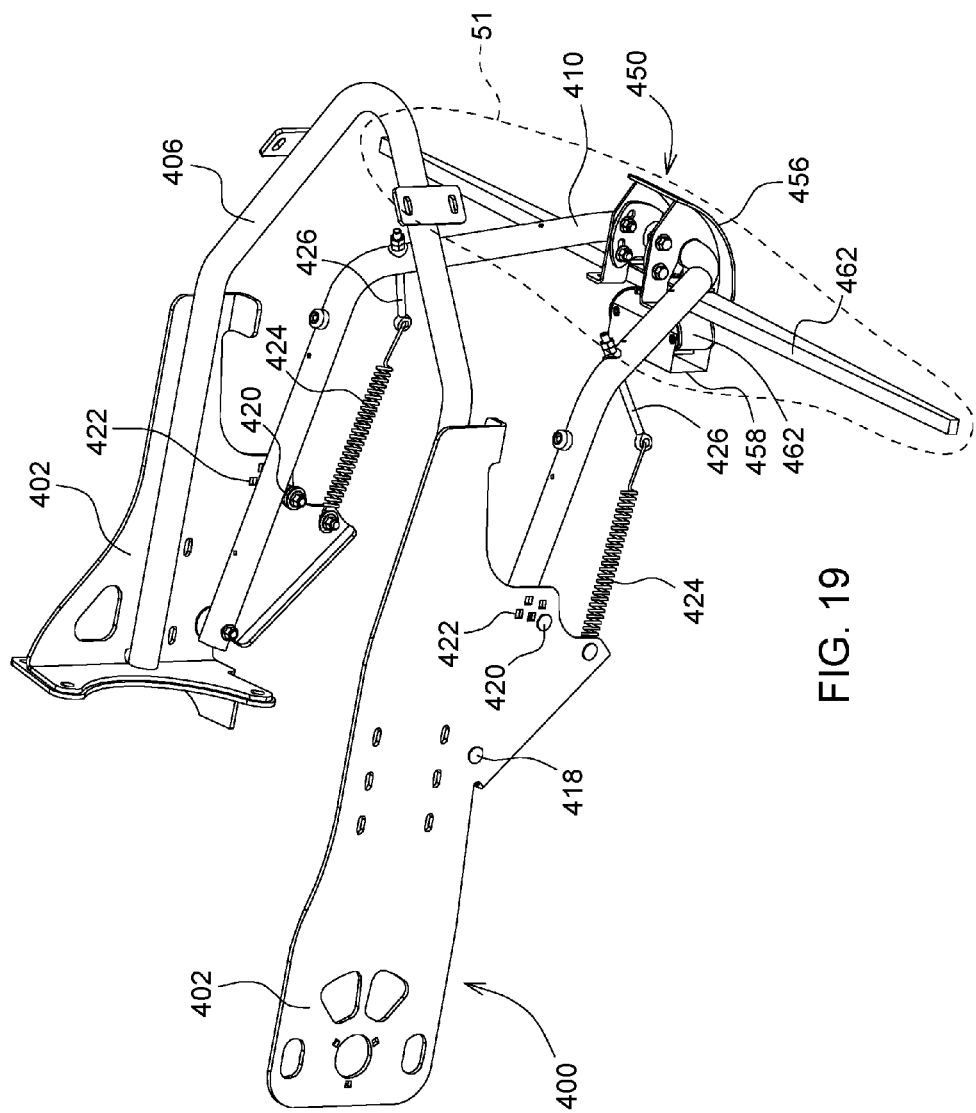
FIG. 19 is another perspective view of FIG. 18 shown detached from the agricultural sprayer.

As shown by FIGS. 14A-14C, the various pivot connections 332, 336, 340 provide various break-away pivots for the arrangement 350. For example, the pivot connection 332 provides an upright (e.g., upward) break-away joint. In some embodiments, it is also used to move the arrangement 350 in a retracted or stowed position to elevate the sensing device 360 and paddle 362 from the ground when not in use, such as when traveling between fields. Pivot connection 336 provides a joint to allow the union bracket 334 to pivot. Pivot connection 340 provides a longitudinal (e.g., rearward and upward) break-away joint for the second extension bar 338 to swing the sensing device 360 and the paddle 362 backward. The assembly thus provides for independent local break-away movement at the pivot connection 340 as well as global, compound break-away movement at the pivot connection 332. Additional pivot connections are included to provide for other upright, longitudinal and/or lateral break-away joints. For example, as shown in FIG. 15, a pivot connection is added at the union of the mounting bracket 322 that extends along a longitudinal axis to permit lateral break-away movement in either right or left (clockwise/counter-clockwise) directions, as is beneficial when the wheel 342 encounters a rut or side embankment(s).

Referring now to FIGS. 16-19, yet another front-of-wheel mounted tactile guidance arrangement 450 is shown which is mounted to a wheel cover support 400, which in turn is mounted to a wheel hub 444 of an associated wheel 442. As previously described, the wheel cover support 400 includes mounting plates 402 mounted to the wheel hub 444 at the inside and outside of the wheel 442. Upright 404 and forward 406 braces, having a "V" or "U" shape bar or tubular construction, is mounted to the inside and outside mounting plates 402 to wrap around, but maintain spacing from, the wheel 342 and to which a shell-like wheel cover 408 is bolted or otherwise mounted. Here again, the arrangement 450 operates in a similar manner as the others described above, including that it tracks the line of travel of the associated wheel 442 to which it is mounted.

More specifically, this arrangement includes a break-away assembly 410, of similar bar or tubular construction as the braces 404 and 406. The rearward ends of the break-away assembly 410 is connected to the inside and outside mounting plates 402 at co-axial pivot connections 418 and is positioned and otherwise limited from pivotal movement by stops 420. Each stop 420 is mounted at various locations at one of multiple openings 422. Springs 424 is connecting between the mounting plates 402 and spring couplers 426 connected to the break-away assembly 410 to bias the break-away assembly 410 into contact with the stops 420. The break-way assembly have a bent-down "U" or "V" shape configuration, and at the valley mount a skid plate 456 and a mounting bracket 458 to which a sensing device 460 and paddle 462 is mounted. The skid plate 456 and/or the mounting bracket 458 is located forward of the wheel 442 aligned with the lateral midpoint or longitudinal centerline of the wheel 442, and also includes multiple connection locations to allow for various mounting heights and orientations. The pivot connections 418 provide an upright (e.g., upward) break-away joint about which the break-away assembly may pivot. Additional pivot connections are included to provide for other upright, longitudinal and/or lateral break-away joints.

The discussion above regarding the example steering control correcting for steering based upon maintaining a uniform or average paddle displacement carries the assumption that the magnets and field-detecting devices (or other sensed components) are equally spaced on each side of a midpoint or center line, and that the wheel path is intended to be centered between the guiding objects. Other example spacing can be accommodated, however, by the controller weighting or offsetting the appropriate values proportionally. Also, the feedback signals from the sensing devices is used for manual steering correction of the vehicle. Rather than outputting the feedback signals to the controller for automatic steering correction, the feedback signals my provide operator alerts or other feedback, such as visual or audible indicators in the operator cabin or elsewhere in the vehicle. Further, the tactile guidance arrangements disclosed herein may be combined with, and used to augment, outer guidance systems (e.g., GPS) of the vehicle.

Figure 20:
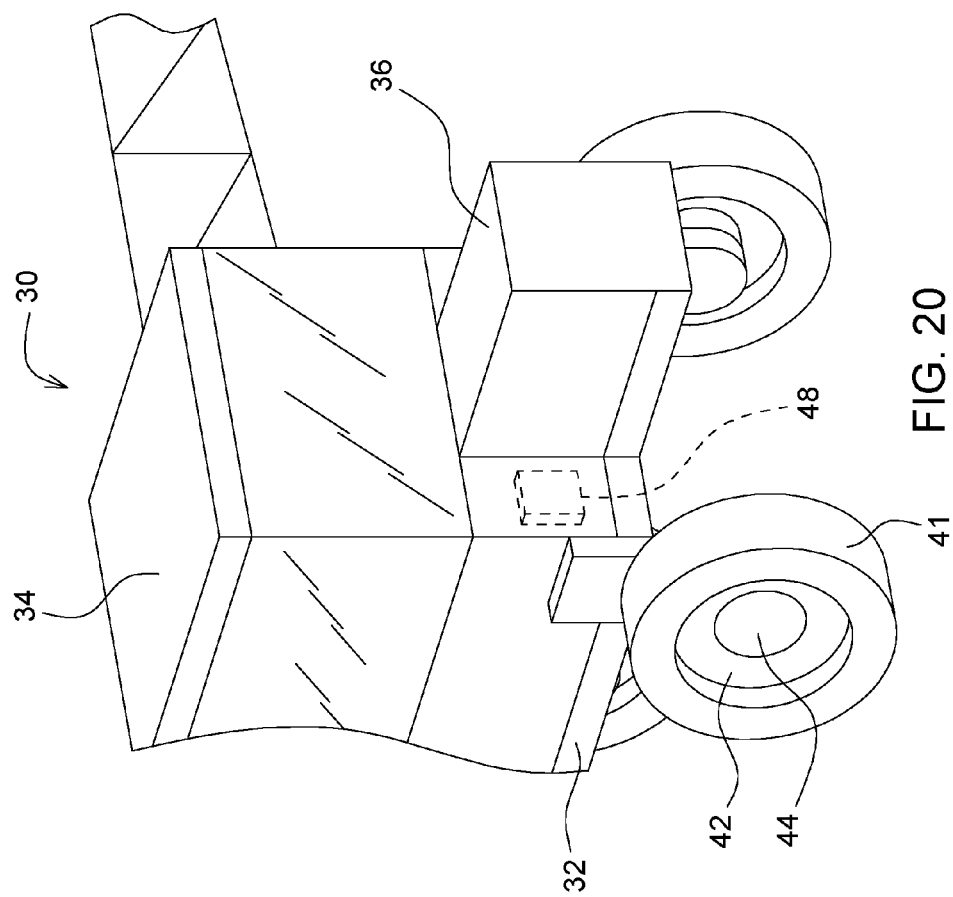
FIG. 20 is a partial perspective view showing an example electronic controller that communicates with a tactile guidance device.

FIG. 20 is a partial perspective view showing an example electronic controller 48 that wirelessly or wire communicates with a tactile guidance system 51. Controller 48 is mounted close to the wheels 42 to reduce the communication propagation time so that the vehicle or wheels 42 can respond quickly when an obstacle (e.g. crop) is sensed by the guidance system 51. In some embodiments, the wheels 42 also are in signal communication with the electronic controller 48 in order to carry out decisions made by the controller 48 and sensing device 60. Alternatively, controller 48 is located with the central console inside the cabin 34, which would protect the electronics from the weather and brushing with the crop leaves.

FIG. 21 is a perspective view of an example ground-engaging wheel 42 that comprises continuous tracks 500 or tank tread wheels. Tracks distribute the weight over a larger surface area of the tread so that there is less soil compaction as a sprayer 30 goes over the crop field. When tracks 500 are used as the front wheels of a vehicle, the tactile guidance system 51 is mounted to the non-rotating axis housing of the front bogie wheel 506 or to a lower (below 50% of the height of the tracks), front end of the plate 520 that is connected to the sprocket 512 of the large upper single bogie. The paddle 62 or the tactile guidance system 51 would still protrude out transversely from the bogie (i.e. protrude out parallel to the axis of the bogies), on either the inner side or outer side of the tracks 500 with respect to the vehicle and direction of travel.

Although the focus of this disclosure is on manually driven spray vehicles, autonomous, self-propelled robots and other motor vehicles can also benefit from the concepts disclosed herein to help the operator or the robot to automatically identify rows, perform automated row and end-row guidance without the operator performing the maneuvers manually or even remotely watching the field.

As used herein the term "vehicle" refers to any type of motorized, self-propelled or unpowered (e.g., trailered) traveling machine, including on-road and off-road machines. For example, off-road machines may include vehicles used in the construction, forestry, and agriculture industries. Agricultural vehicles may include, for example, any of various harvesters, balers, sprayers, fertilizers, applicators, and cultivators. Additionally, the use of the terms "lateral" or "laterally" or "transverse" and "transversely" refer to a direction that diverges or intersects the travel direction of the vehicle or one or more ground-engaging wheels of the vehicle (e.g. transverse is at a non-zero angle with respect to the direction of travel).

Finally, the orientation and directions stated and illustrated in this disclosure should not be taken as limiting. Many of the orientations stated in this disclosure and claims are with reference to the direction of travel of the equipment. But, the directions, e.g. "behind" can also are merely illustrative and do not orient the embodiments absolutely in space. That is, a structure manufactured on its "side" or "bottom" is merely an arbitrary orientation in space that has no absolute direction. Also, in actual usage, for example, the vehicles may perform pitches, yaws or rolls in which case "top" may be pointing to the side or upside down. Thus, the stated directions in this application may be arbitrary designations.

In the present disclosure, the descriptions and example embodiments should not be viewed as limiting. Rather, there are variations and modifications that may be made without departing from the scope of the appended claims.

What is claimed is:

1. A tactile guidance arrangement for a vehicle having wheels, comprising:
   a tactile guidance system having a contact device and a sensing device, wherein the sensing device detects a displacement of the contact device;
   a mounting configuration that locates the tactile guidance system to one of at least two positions:
   a first position wherein the tactile guidance system is mounted on a bracket that is coupled to a wheel hub on an inner side of a front ground-engaging wheel; and
   a second position wherein the tactile guidance system is coupled to a shield for a tire of the front ground-engaging wheel; and
   wherein the contact device protrudes out away from the front ground-engaging wheel in a direction transverse to the wheel hub and to a direction of travel of the front ground-engaging wheel.

2. The tactile guidance arrangement of claim 1, wherein in either the first position or in the second position, only one of the tactile guidance system is mounted to each of two front ground-engaging wheels of the vehicle, and wherein front is towards the direction of travel.

3. The tactile guidance arrangement of claim 2, wherein the tactile guidance system with the contact device is single-sided, and wherein the contact device includes only one paddle that transversely extends out past the front ground-engaging wheel.

4. The tactile guidance arrangement of claim 2, wherein in the first position, the sensing device and a first end of the contact device are protected by being positioned in a cavity of the front ground-engaging wheel, wherein the cavity is between the wheel hub and an outer rim of the front ground-engaging wheel.

5. The tactile guidance arrangement of claim 4, wherein in the first position, the bracket is attached to a wheel motor frame connected to the wheel hub, and wherein the sensing device and the first end of the contact device are located on a lower end of the bracket, wherein the lower end is closer to a ground surface.

6. The tactile guidance arrangement of claim 1, wherein in the first position, the bracket includes multiple holes to which the tactile guidance system is bolted to or slotted into to adjust a height of the contact device from a ground surface.

7. The tactile guidance arrangement of claim 1, wherein in the first position, the bracket includes a slide latch to which the tactile guidance system is mounted; and wherein the slide latch is electrically controlled to remotely adjust a height of the tactile guidance system.

8. The tactile guidance arrangement of claim 1, wherein the contact device includes an elastomeric material and a magnet whose magnetic field is detected by the sensing device, wherein changes in a strength of the magnetic field correlates with the displacement of the contact device from the sensing device.

9. The tactile guidance arrangement of claim 1, wherein the vehicle comprises an agricultural spray vehicle or an autonomous ground scout; and the vehicle further comprises a controller that receives information from the sensing device, and determines a location of a crop that touches the contact device.

10. The tactile guidance arrangement of claim 9, wherein the contact device includes a paddle to brush against objects to identify crop rows, wherein the paddle comprises a rod that protrudes out of the inner side of the front ground-engaging wheel.

11. The tactile guidance arrangement of claim 9, wherein the front ground-engaging wheel comprises continuous tracks and the tactile guidance system is coupled to a lower a front end of the continuous tracks.

12. The tactile guidance arrangement of claim 9, wherein the front ground-engaging wheel is protected by a forward wheel shield or a forward brace that straddles over the tire of the front ground-engaging wheel.

13. The tactile guidance arrangement of claim 1, wherein the shield comprises a crossbar mounting bracket, wherein the crossbar mounting bracket is bolted to an inner side and also to an outer side of the wheel hub; and the tactile guidance system is bolted to the crossbar mounting bracket on the inner side, with the contact device extending out transverse to the crossbar mounting bracket and to the wheel hub; wherein the crossbar mounting bracket also serves as a wheel shield.

14. An agricultural vehicle having a tactile guidance system, comprising:
   ground-engaging front wheels;
   the tactile guidance system having a flexible paddle and a sensor that detects a displacement of the flexible paddle;

wherein the tactile guidance system is mounted at an adjustable height to a bracket that is coupled to a wheel hub on an inner side of each of the ground-engaging front wheels;

wherein the flexible paddle protrudes out past the ground-engaging front wheels in a direction transverse to a direction of travel of the ground-engaging front wheels; and the agricultural vehicle having a controller that bases a travel path from detected results of the sensor.

15. The agricultural vehicle of claim 14, wherein the adjustable height includes multiple holes to which the tactile guidance system is bolted or slotted into to adjust a height of the flexible paddle from a ground surface.

16. The agricultural vehicle of claim 14, wherein the ground-engaging front wheels are each protected by a forward wheel shield or a forward brace that straddles over a tire of the ground-engaging front wheels.

17. The agricultural vehicle of claim 14, wherein the controller receives information from the sensor, and determines a location of a crop that contacts the flexible paddle.

18. The agricultural vehicle of claim 14, wherein and end of the tactile guidance system is mounted to a pivotal connector or lever that flips up the tactile guidance system.

19. An agricultural vehicle having a travel-guidance system, the agricultural vehicle comprising:

a ground-engaging front wheel;

the travel-guidance system having a paddle and a sensor, wherein the sensor detects a displacement of the paddle;

wherein the travel-guidance system is mounted at an adjustable height to a bracket that is coupled to a wheel hub on one side of the ground-engaging wheel;

wherein the paddle protrudes out away from the ground-engaging front wheel in a direction transverse to the wheel hub and to a direction of travel of the ground-engaging front wheel; and a controller that determines a travel path of the ground-engaging front wheel based on the paddle contacting objects.

20. The agricultural vehicle of claim 19, wherein the paddle has a single-sided contact rod comprising an elastomeric material and a magnetic material whose magnetic field is detected by the sensor; and wherein the agricultural vehicle comprises a crop sprayer.

* * * * *